United States Patent
Patel et al.

(10) Patent No.: US 12,505,241 B2
(45) Date of Patent: Dec. 23, 2025

(54) SYSTEM AND METHOD FOR ACCESS CONTROL TO AND MANAGEMENT OF DIAGNOSTIC DATA

(71) Applicant: Dell Products L.P., Round Rock, TX (US)

(72) Inventors: Dharmesh M. Patel, Round Rock, TX (US); Prem Pradeep Motgi, Austin, TX (US); Manpreet Singh Sokhi, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 445 days.

(21) Appl. No.: 18/190,467

(22) Filed: Mar. 27, 2023

(65) Prior Publication Data

US 2024/0330494 A1 Oct. 3, 2024

(51) Int. Cl.
G06F 11/34 (2006.01)
G06F 11/07 (2006.01)
G06F 21/62 (2013.01)

(52) U.S. Cl.
CPC .................. *G06F 21/6218* (2013.01)

(58) Field of Classification Search
CPC .......................... G06F 21/6218; G06F 21/6245
USPC .......................................................... 709/201
See application file for complete search history.

(56) References Cited

U.S. PATENT DOCUMENTS

| 6,606,620 | B1 | 8/2003 | Sundaresan |
| 7,028,049 | B1 * | 4/2006 | Shelton ............... H04L 63/10 |
| | | | 707/999.009 |
| 8,117,235 | B1 | 2/2012 | Barta |
| 8,255,948 | B1 | 8/2012 | Black et al. |

(Continued)

FOREIGN PATENT DOCUMENTS

| CN | 202058147 U | 11/2011 |
| CN | 115292285 A | 11/2022 |

(Continued)

OTHER PUBLICATIONS

D. Fedasyuk and I. Lutsyk, "Tools for adaptation of a mobile application to the needs of users with cognitive impairments," 2021 IEEE 16th International Conference on Computer Sciences and Information Technologies (CSIT), Lviv, Ukraine, 2021, pp. 321-324, doi: 10.1109/CSIT52700.2021.9648702. (Year: 2021).

(Continued)

*Primary Examiner* — Ruolei Zong
(74) *Attorney, Agent, or Firm* — WOMBLE BOND DICKINSON (US) LLP

(57) ABSTRACT

Methods and systems for managing collection of diagnostic data are disclosed. To collect diagnostic data, unmanaged devices may be used. The unmanaged devices may be registered with a data management system. During the registration process, procedures for processing diagnostic data from the unmanaged devices may be established. The procedures may be established based on data collection performance of the unmanaged devices. The procedures may reduce the likelihood of use of diagnostic data that is (Continued)

unreliable. Once obtained, the diagnostic data may be rated for different uses based on the performance of the hardware used to obtain the diagnostic data. Access controls for the diagnostic data may be put in place to manage distribution of the diagnostic data.

20 Claims, 14 Drawing Sheets

(56) References Cited

U.S. PATENT DOCUMENTS

| | | | |
|---|---|---|---|
| 9,361,428 | B2 | 6/2016 | Bessette |
| 9,571,890 | B1 | 2/2017 | Diamondstein |
| 10,073,948 | B2 | 9/2018 | Cohen et al. |
| 11,010,392 | B1 | 5/2021 | Hirsch et al. |
| 11,094,402 | B2 | 8/2021 | Brown et al. |
| 11,217,331 | B2 | 1/2022 | Vishnubhatla et al. |
| 11,631,401 | B1 | 4/2023 | Nudd |
| 11,763,821 | B1 | 9/2023 | McNair |
| 11,849,069 | B1 | 12/2023 | Can |
| 12,135,708 | B2 | 11/2024 | Chermside |
| 2003/0046401 | A1 | 3/2003 | Abbott |
| 2004/0117215 | A1* | 6/2004 | Marchosky ............ G16H 10/60 705/3 |
| 2005/0160166 | A1 | 7/2005 | Kraenzel |
| 2005/0165627 | A1* | 7/2005 | Fotsch ................... G16H 10/60 707/999.009 |
| 2005/0203771 | A1* | 9/2005 | Achan ................... G16H 30/20 705/2 |
| 2008/0154961 | A1 | 6/2008 | Dougall |
| 2008/0275701 | A1 | 11/2008 | Wu et al. |
| 2009/0171692 | A1* | 7/2009 | Zilberman ............ G16H 10/60 715/745 |
| 2009/0300170 | A1 | 12/2009 | Bhame |
| 2010/0169304 | A1 | 7/2010 | Hendricksen et al. |
| 2011/0131174 | A1 | 6/2011 | Birch et al. |
| 2012/0265771 | A1 | 10/2012 | Suh |
| 2014/0181673 | A1 | 6/2014 | Work |
| 2014/0201199 | A1 | 7/2014 | Hajaj |
| 2014/0207885 | A1 | 7/2014 | Baker et al. |
| 2014/0245398 | A1 | 8/2014 | Son |
| 2014/0288947 | A1 | 9/2014 | Simpson |
| 2014/0344288 | A1 | 11/2014 | Evans |
| 2015/0067176 | A1 | 3/2015 | Dubois |
| 2015/0169574 | A1 | 6/2015 | Bau et al. |
| 2015/0199268 | A1 | 7/2015 | Davis et al. |
| 2015/0356127 | A1 | 12/2015 | Pierre et al. |
| 2016/0006839 | A1 | 1/2016 | Sawazaki |
| 2016/0087976 | A1 | 3/2016 | Kaplan |
| 2016/0112208 | A1* | 4/2016 | Williams ............... H04L 9/3268 713/176 |
| 2016/0164813 | A1 | 6/2016 | Anderson |
| 2016/0231928 | A1 | 8/2016 | Lewis et al. |
| 2016/0232159 | A1 | 8/2016 | Parikh |
| 2016/0306812 | A1 | 10/2016 | McHenry et al. |
| 2017/0013047 | A1 | 1/2017 | Hubbard |
| 2017/0078195 | A1 | 3/2017 | Raman |
| 2017/0262164 | A1 | 9/2017 | Jain |
| 2017/0288867 | A1* | 10/2017 | Collier .................. G06F 21/602 |
| 2017/0330297 | A1* | 11/2017 | Cronin .................. A61B 5/6802 |
| 2017/0365101 | A1 | 12/2017 | Samec et al. |
| 2018/0068108 | A1 | 3/2018 | Fish |
| 2018/0121502 | A1 | 5/2018 | Prieur |
| 2018/0189352 | A1 | 7/2018 | Ghafourifar |
| 2018/0203612 | A1 | 7/2018 | Kats et al. |
| 2019/0012931 | A1 | 1/2019 | Candelore |
| 2019/0079855 | A1 | 3/2019 | Dewitt |
| 2019/0279744 | A1 | 9/2019 | Howley et al. |
| 2019/0297035 | A1 | 9/2019 | Fox et al. |
| 2019/0325036 | A1 | 10/2019 | Edge |
| 2020/0100724 | A1* | 4/2020 | Golay .................... G16H 30/40 |
| 2020/0110882 | A1 | 4/2020 | Ripolles Mateu et al. |
| 2020/0226216 | A1 | 7/2020 | Marin et al. |
| 2020/0258516 | A1 | 8/2020 | Khaleghi |
| 2021/0056131 | A1 | 2/2021 | Ackermann et al. |
| 2021/0065203 | A1 | 3/2021 | Billigmeier et al. |
| 2021/0256534 | A1 | 8/2021 | An |
| 2021/0390196 | A1 | 12/2021 | Lavine et al. |
| 2022/0059216 | A1 | 2/2022 | Lewis |
| 2022/0078007 | A1 | 3/2022 | Reddem |
| 2022/0261152 | A1 | 8/2022 | Jude et al. |
| 2022/0293087 | A1 | 9/2022 | Kumar |
| 2022/0334719 | A1 | 10/2022 | Thrane |
| 2022/0366131 | A1 | 11/2022 | Ekron |
| 2023/0061725 | A1 | 3/2023 | Khan |
| 2023/0068099 | A1 | 3/2023 | Abramenko et al. |
| 2023/0137931 | A1 | 5/2023 | Song |
| 2023/0221911 | A1 | 7/2023 | Bandameedipalli |
| 2023/0223142 | A1* | 7/2023 | Joao ...................... H04N 7/141 705/2 |
| 2023/0319026 | A1 | 10/2023 | Waltermann |
| 2024/0177815 | A1* | 5/2024 | Bilal ...................... G16H 40/67 |
| 2025/0017547 | A1 | 1/2025 | Raveendranath |

FOREIGN PATENT DOCUMENTS

| | | |
|---|---|---|
| JP | 4808173 B2 | 11/2011 |
| JP | 2015-106406 A | 6/2015 |
| WO | 2023/220948 A1 | 11/2023 |

OTHER PUBLICATIONS

Page, Sébastien, "How to move your Health data from one iPhone to another," iDB, Web Page <https://www.idownloadblog.com/2016/10/13/health-data-importer-makes-moving-your-health-data-from-one-iphone-to-another-a-breeze/> accessed on Oct. 30, 2022 (9 Pages).
"MyChart," Web Page <https://www.mychart.org/> accessed on Oct. 30, 2022 (6 Pages).
Xu, Jie, et al., "Federated learning for healthcare informatics," Journal of Healthcare Informatics Research 5 (2021): 1-19. (19 Pages).
Naz, Sadaf, et al., "A comprehensive review of federated learning for COVID-19 detection," International Journal of Intelligent Systems 37.3 (2022): 2371-2392. (22 Pages).
Prasser, Fabian, et al., "Efficient and effective pruning strategies for health data de-identification," BMC medical Informatics and decision making 16.1 (2016): 1-14. (14 Pages).
Balaskas, Georgios, et al., "An end-to-end system for transcription, translation, and summarization to support the co-creation process. A Health Cascade Study", ACM Petra '23, published Aug. 10, 2023, pp. 625-631. (Year: 2023) (7 Pages).
"FollowMyHealth®," Allscripts Healthcare Solutions Inc, Google Play Store, Web Page <https://play.google.com/store/apps/details?id=com.jardogs.fmhmobile&hl=en_US&gl=US> accesed on Jan. 8, 2023 (4 Pages).

* cited by examiner

SYSTEM AND METHOD FOR ACCESS CONTROL TO AND MANAGEMENT OF DIAGNOSTIC DATA

FIELD

Embodiments disclosed herein relate generally to data collection. More particularly, embodiments disclosed herein relate to systems and methods to manage collection of diagnostic data.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
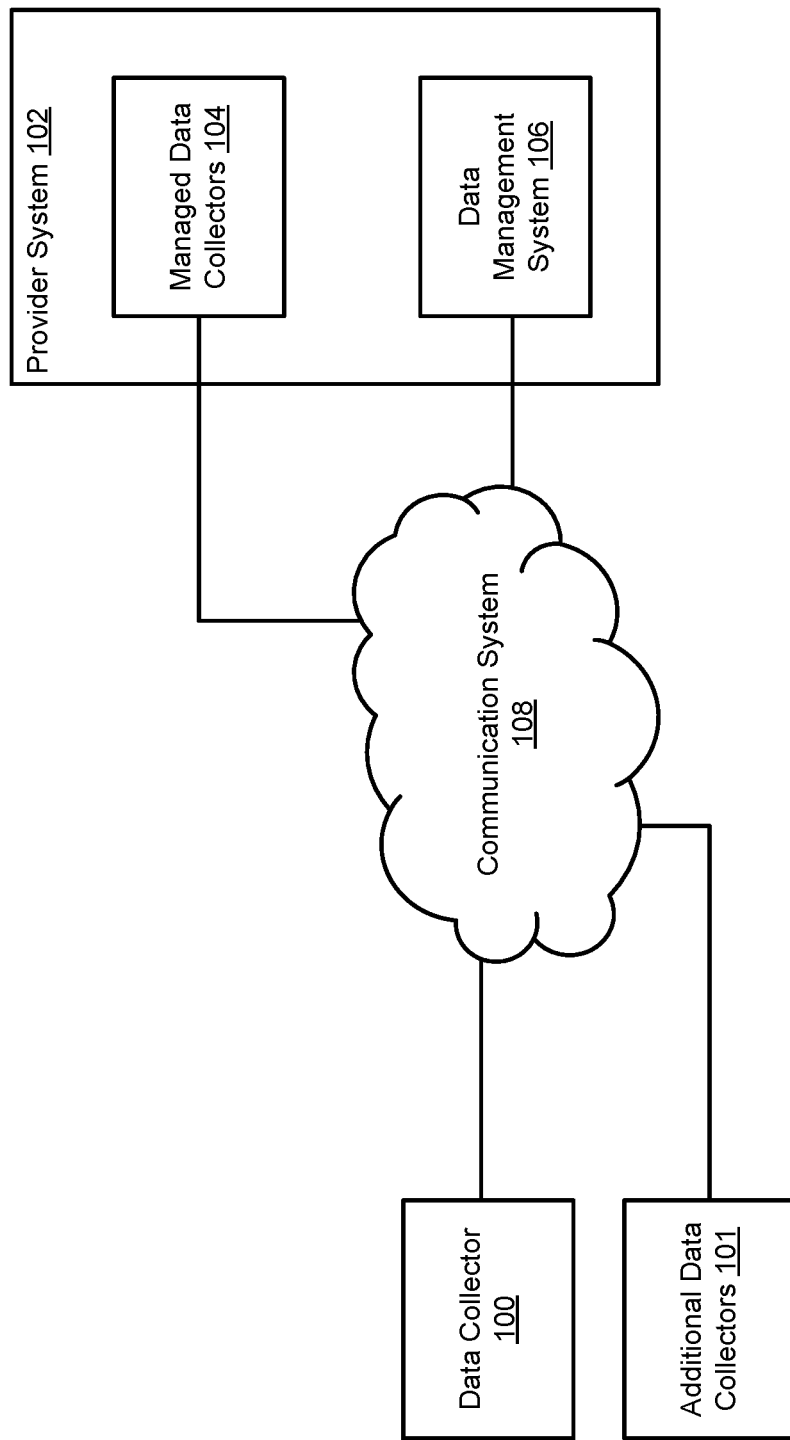
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing collection of diagnostic data. The diagnostic data may be usable, for example, to diagnose and/or treat persons for various medical conditions.

The diagnostic data may be collected using managed devices and unmanaged devices. Managed devices may include diagnostic equipment managed by a healthcare provider. Unmanaged devices may include personal electronic devices such as cell phones managed by a person.

To collect diagnostic data using the unmanaged devices, the unmanage devices may be registered with a data collection system. The unmanaged devices may be registered by (i) establishing identification, cryptographic, and/or other types of information usable by the data management system to securely collect diagnostic data from the unmanaged devices, and (ii) establishing procedures for processing diagnostic data collected from the unmanaged devices.

The procedures may be established based on the capabilities of the unmanaged devices. The capabilities may be ascertained through a qualification process. The qualification process may include performance of various actions using the unmanaged devices to obtain a data package. The data package may be used to ascertain limits on the performance of data collection hardware of the unmanaged devices. The limits on the performance of the data collection hardware may be used to establish the procedures. The procedures may improve the likelihood that diagnosis made using the collected diagnostic data are not impacted by the limits on the performance of the data collection hardware.

Once the diagnostic data is obtained, the diagnostic data may be analyzed to identify relevance for different uses. The diagnostic data may be divided and stored in a manner so that different portions of the diagnostic data relevant for different uses are identifiable. When requests for diagnostic data are received, responsive data based on the type and the use for the diagnostic data may be used to discriminate responsive diagnostic data from non-responsive diagnostic data.

The diagnostic data may be rated for different uses based on the performance of the data collection hardware used to collect the diagnostic data. The ratings may be obtained based on performance standards for the data collection hardware with respect to different uses (e.g., types of analysis usable to diagnose and/or otherwise treat patients).

Additionally, access controls for the diagnostic data may be put in place to limit distribution of diagnostic data. The access controls may be put in place based on entities that are similar to one another and/or likely to utilize the diagnostic data for diagnostic purposes. The access controls may be ratified by and/or modified by a person for which the diagnostic data is collected for diagnostic purposes.

By collecting diagnostic data using both managed and unmanaged devices, a better picture of the actual condition of a person may be established. The improved picture of the condition of the person may improve the likelihood of accurate diagnosis and corresponding treatment.

By both registering the unmanaged devices and qualifying the collected diagnostic data, security and quality for the collected diagnostic data may be managed. By managing both the security and quality of the collected data, diagnosis and treatment established based on the collected diagnostic data may be less likely to be impacted by the manner in which the diagnostic data is collected. Thus, embodiments disclosed herein may address, among others, the technical problem of data collection using unmanaged devices which may not be subject to similar levels of quality control, upkeep, and maintenance applied to managed devices. By implementing both security (e.g., access control) and quality control mechanisms for collected diagnostic data, more reliable diagnostic data may be collected.

In an embodiment, a method for managing data collection for managed devices and unmanaged devices is provided. The method may include obtaining a request for a type of diagnostic data that: was obtained from an unmanaged device of the unmanaged devices, and is stored in a data management system; identifying, based on the request, a record in which diagnostic data of the type of diagnostic data is stored; obtaining, from the records, access information specifying: a first entity that initiated obtaining of the diagnostic data, and a second entity that did not initiate obtaining of the diagnostic data and that attested to utility of the diagnostic data; making a determination regarding whether an entity that initiated the request is the first entity or the second entity; in a first instance of the determination where the entity is the first entity or the second entity: providing the entity that initiated the request access to the diagnostic data to service the request; in a second instance of the determination where the entity is not the first entity or the second entity: denying the entity that initiated the request access to the diagnostic data.

The method may also include, prior to obtaining the request: obtaining, from the first entity, a request for the diagnostic data; identifying the second entity based on the diagnostic data; obtaining, from the second entity, and indication of the utility of the diagnostic data; and updating the request for the diagnostic data to indicate that the first entity and the second entity are to be provided access to the diagnostic data.

Identifying the second entity may include identifying, based on the type of the diagnostic data, at least one first candidate entity (e.g., a healthcare provider); identifying, based on a type of the first entity, at least one second candidate entity; and identifying the second entity based on the at least one first candidate entity and the at least one second candidate entity.

Identifying the second entity based on the at least one first candidate entity and the at least one second candidate entity may include identifying that the second entity is a member of the at least one first candidate entity and the at least one second candidate entity to determine that the second entity is likely to use the diagnostic data. In other words, the candidate entity may need to have both a similar role and similar likely use for the diagnostic data, rather than just having a similar role or likely similar use for the diagnostic data.

The at least one first candidate entity may include members that each are associated with the type of the diagnostic data (e.g., entities may be associated with types of diagnostic data), and the at least one second candidate entity may include members that each are associated with the type of the first entity (e.g., entities of a similar type may be associated with each other).

The members of the at least one second candidate entity have a same role.

The members of the at least one first candidate entity have a role that is likely to utilize the diagnostic data in performance of the role.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

The computer implemented services may be used to provide, for example, healthcare services. For example, the computer implemented services may be utilized by healthcare providers to diagnose patients, store information regarding previously made diagnosis, etc.

To provide the computer-implemented services, the system may include provider system 102. Provider system 102 may facilitate storage and use of information. For example, provider system 102 may aggregate digital medical records, or other types of records, used to provide healthcare and/or other types of services.

Provider system 102 may include managed data collectors 104 and data management system 106. Each of these components is discussed below.

Managed data collectors 104 may facilitate acquisition of diagnostic data regarding patients. Managed data collectors 104 may include any quantity and type of computerized medical equipment. The computerized medical equipment may allow information regarding patients to be obtained, stored, analyzed, etc. For example, a magnetic resonance imaging (MRI) system may be example of a type of computerized medical equipment. The MRI system may utilize sensors to characterize portions of a patient and generate digital records of the characterizations (e.g., records including diagnostic information regarding patients). While described with respect to an example, it will be appreciated that computerized medical equipment may include any type of device through which information regarding a patient may be obtained by sensing characteristics of the patient, samples from a patient, etc.

The information obtained through managed data collectors 104 may be stored for use in data management system 106. Data management system 106 may facilitate storage and use of stored diagnostic information. The stored diagnostic information may be used by medical professionals to diagnose, treat, and/or otherwise manage patient care.

However, the ability of medical providers to provide medical care using the stored diagnostic information may depend on the reliability, fidelity, and other characteristics of the stored diagnostic information. If low reliability diagnostic information is stored in data management system 106, then medical professionals may create care plans that are unlikely to resolve the medical issues impacting patients.

For example, if diagnostic data of low fidelity is stored in data management system 106, a medical professionals may be more likely to miss important details for differential diagnosis between different medical issues that may or may not be impacting patients. Also, if the quality of the diagnostic data is not apparent, then medical professionals may misinterpret the diagnostic data leading to undesired patient care outcomes.

Additionally, the ability of medical providers to provide medical care using the stored diagnostic information may depend on the types and quantity of stored diagnostic information. If insufficient diagnostic information is stored in data management system 106, then medical professionals may be more likely to misdiagnose patients.

Further, storing diagnostic data from data collectors 100, 101, 104 in data management system 106 may present risk to the person. Distribution of the diagnostic data to persons that are not contributing to treatment of the patient may be undesired.

In general, embodiments disclosed herein may provide methods, systems, and/or devices for managing collection, storage, and use of diagnostic information (e.g., in aggregate "diagnostic data management services"). The disclosed systems may facilitate increased collection of diagnostic information, improve the reliability of collected diagnostic information, and may improve the security of collected diagnostic information.

To provide diagnostic data management services, the system of FIG. 1 may facilitate collection of diagnostic information from data collector 100. In contrast to managed data collectors 104 which may be professionally managed by medical professionals, data collector 100 may be managed by a patient or other persons that are not medical professionals. For example, data collector 100 may be implemented using a personal electronic device (e.g., a cell phone, smart phone, a tablet computer, etc.), a personal sensing system (e.g., heart rate monitoring device such as a smart ring or smart watch), or other type of device that may be owned, managed, or used by a patient. The person may also utilize a range of additional data collectors 101. Additional data collectors 101 may be similar to and/or different from (e.g., may be other types of data collection devices) data collector 100. Diagnostic information from all of these collectors (e.g., 100, 101, 104) may be used to establish a broad picture of the condition of a person.

Data collector 100 and additional data collectors 101 may include one or more sensors through which information regarding a person may be obtained. The sensors may collect any type and quantity of information regarding the person.

Various data collectors 100, 101, 104 may collect similar or different diagnostic information. Depending on the available data collection hardware, diagnostic data at different levels of fidelity, reliability, etc. may be collected. Thus, in some cases similar diagnostic data may be able to be collected from multiple collectors.

Figure 2A:
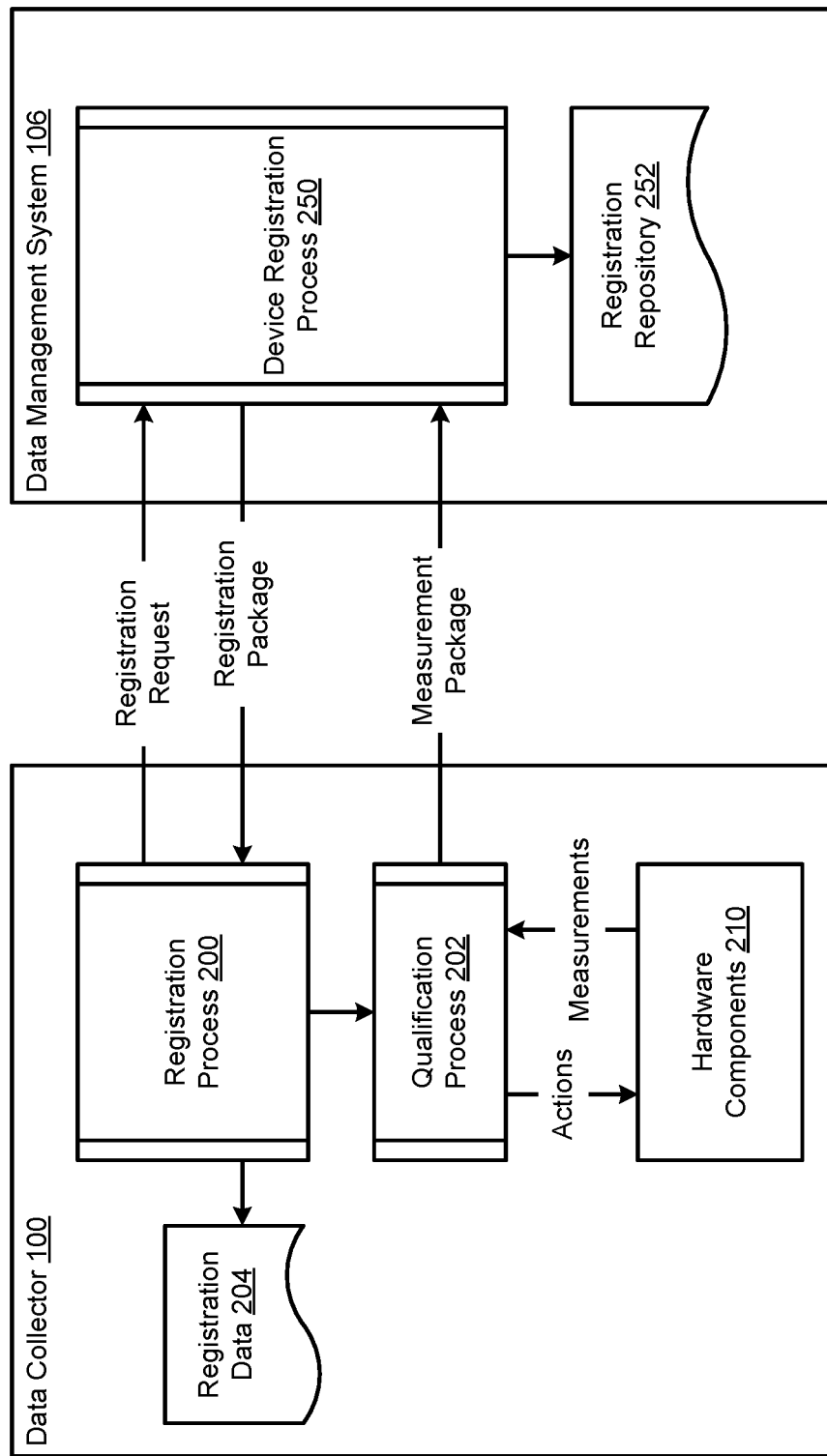
FIGS. 2A-2C show diagrams illustrating data flows in accordance with an embodiment.
Figure 2B:
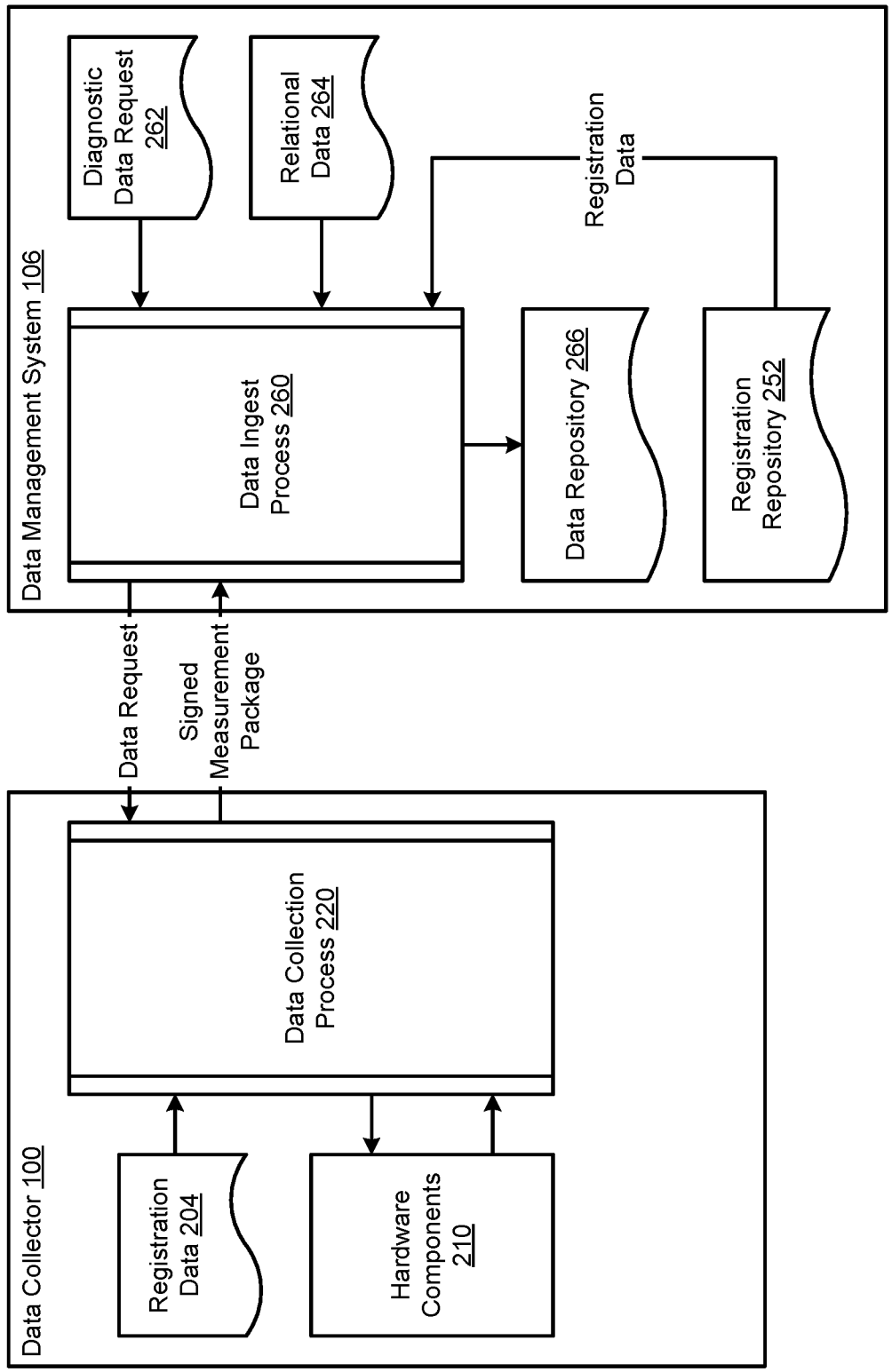
Figure 2C:
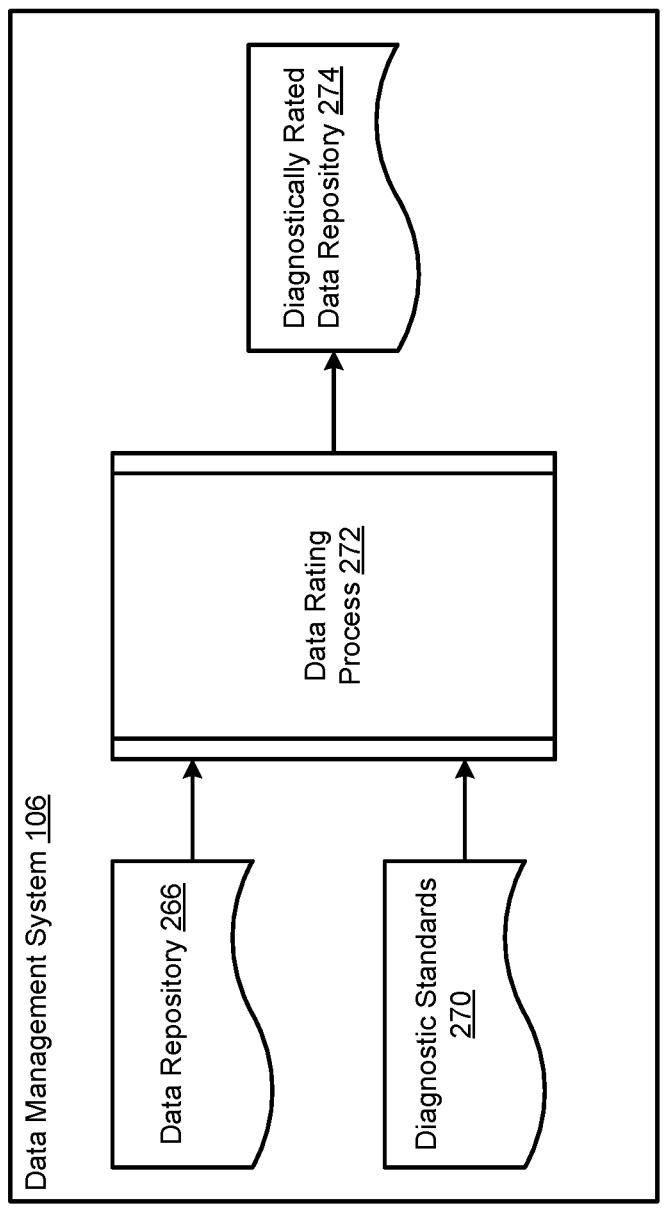
Figure 2D:
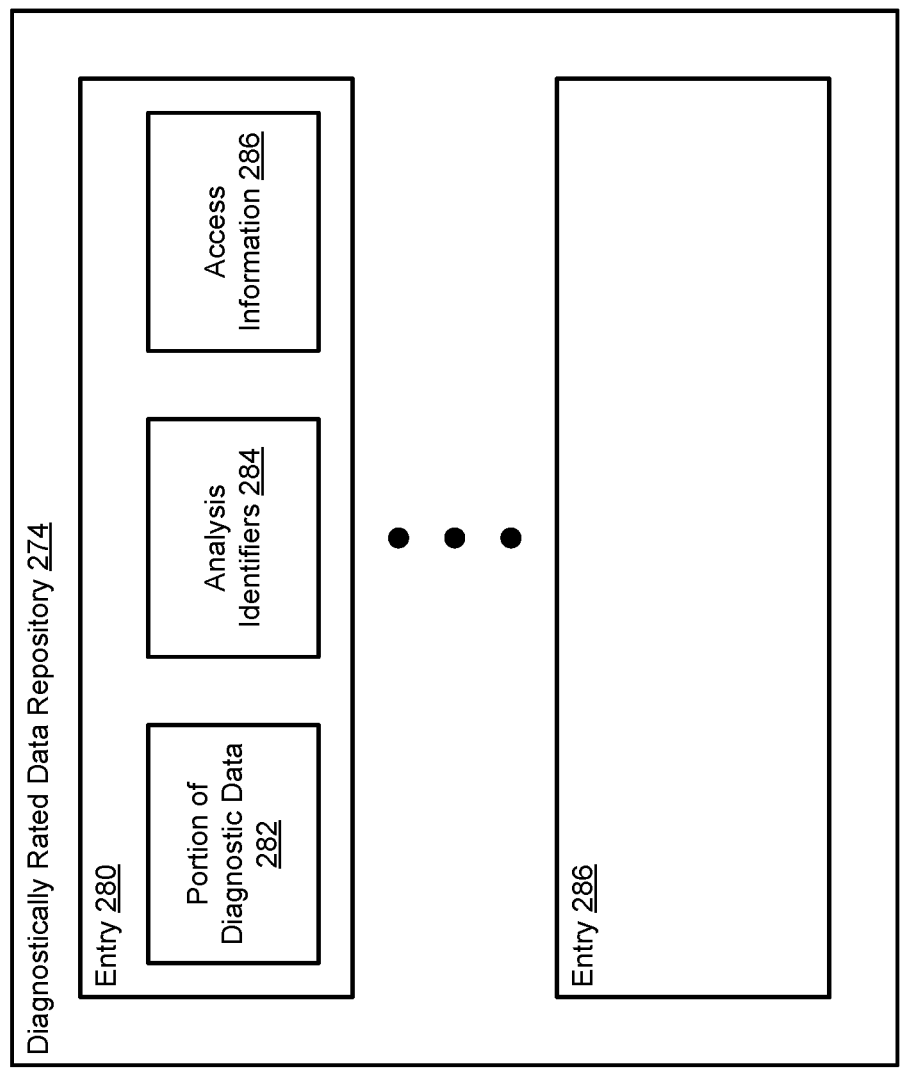
FIG. 2D show a diagram illustrating a data structure in accordance with an embodiment.

To manage collection of diagnostic data using data collector 100, data management system 106 may (i) register data collector 100 and additional data collectors 101, (ii) once registered, qualify data collector 100 and additional data collectors 101 with respect to their ability to obtain different type of diagnostic information, (iii) obtain qualified types of diagnostic information obtained from data collector 100 and additional data collectors 101, (iv) store the obtained diagnostic data with stamps or other types of metadata usable to characterize the quality of the diagnostic data, and (v) provide selective access to the diagnostic information and/or information based on the diagnostic information to persons (e.g., medical providers part of provider system 102) and/or other devices (e.g., part of provider system 102) depending on the type of analysis that will be performed using the diagnostic information as well as access controls for the diagnostic data. Refer to FIG. 2A for additional details regarding registration of data collector 100. Refer to FIG. 2B for additional details regarding obtaining diagnostic information using data collector 100. Refer to FIGS. 2C-2D for additional details regarding preparation for selectively providing diagnostic information.

Figure 2E:
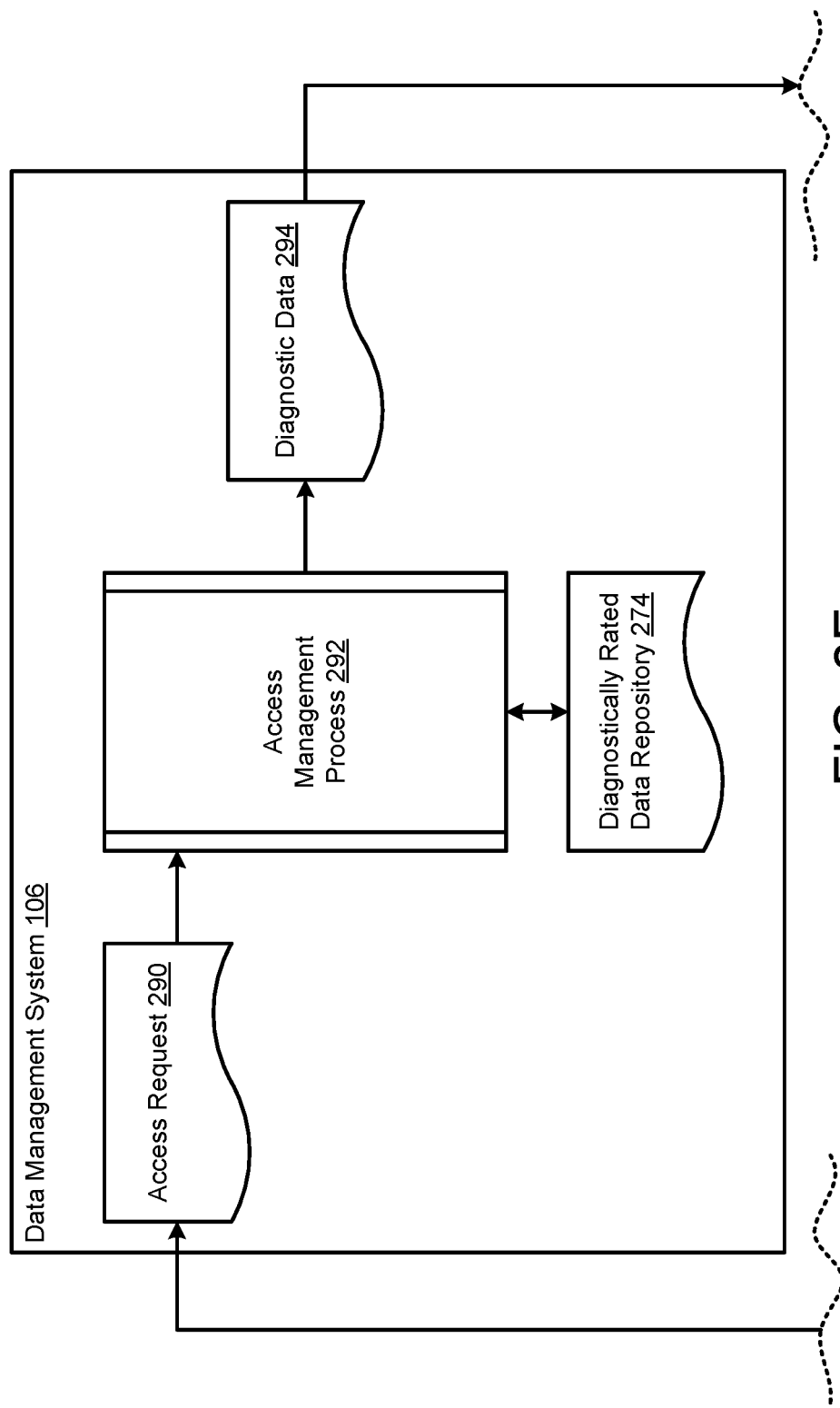
FIG. 2E show a diagram illustrating a data flow in accordance with an embodiment.

To manage access to the diagnostic data, access controls may be established prior to and during acquisition of the diagnostic data. For example, when requests for diagnostic data are initiated, the requests may be analyzed to ascertain likely consumers (e.g., healthcare providers) of the diagnostic data. Interest in the diagnostic data by the likely consumers may be confirmed, and access controls for the diagnostic data may be established based on the interest. Once in place, the access controls may limit access to the obtained diagnostic data. By doing so, distribution of the diagnostic information may be limited. Refer to FIG. 2E for limiting access to diagnostic data using access controls.

When providing their functionality, any of data collector 100, additional data collectors 101, and data management system 106 may perform all, or a portion, of the methods illustrated in FIGS. 4A-4F.

Any of data collector 100, additional data collectors 101, and data management system 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

Data management system 106 may be implemented with multiple computing devices. For example, data management system 106 may be implemented with a data center, cloud installation, or other type of computing environment. The computing environment may host a software stack for registering data collectors, and system for obtaining and managing diagnostic information.

Any of the components illustrated in FIG. 1 may be operably connected to each other (and/or components not illustrated) with communication system 108. In an embodiment, communication system 108 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Additionally, while illustrated in FIG. 1 with respect to a data collector 100, it will be appreciated that the system may include any number of additional data collectors 101 which may each collect similar and/or different diagnostic data. For example, a patient may have both a smart phone and smart watch. Each may include some similar sensors and some different sensors through which diagnostic information may be obtained and provided to data management system 106.

To further clarify embodiments disclosed herein, diagrams illustrating data flows implemented by and data structures used by a system over time in accordance with an embodiment are shown in FIGS. 2A-2C, 2E, and 3. Additionally, a data structure diagram in accordance with an embodiment is shown in FIG. 2D.

Turning to FIG. 2A, a first data flow diagram illustrating data flows, data processing, and/or other operations that may be performed by the system of FIG. 1 in accordance with an embodiment is shown. In FIG. 2A, example flows between data collector 100 and data management system 106 are shown. It will be appreciated that similar flow with respect to additional data collectors 101 and data management system 106 may be present.

To manage collection of data from data collector 100, data management system 106 may require that data collector 100 be registered with it prior to allowing diagnostic data to be obtained and used for diagnostic purposes. To register, data collector 100 may perform registration process 200. During registration process 200, data collector 100 may send a registration request to device registration process 250 performed by data management system 106.

The registration request may include information regarding data collector 100. For example, the registration request may include an inventory of hardware and software hosted by data collector 100, may include identifying information such as a part number, revision number, product identifier, and/or other types of information regarding data collector 100. Additionally, the registration request may include information regarding a person that will provide diagnostic data using data collector 100, or may not include information regarding the person (e.g., the information regarding the person may be provided to data management system 106 via other processes).

Once obtained, device registration process 250 may use the information to (i) establish a registration for data collector 100 in registration repository 252, (ii) generate cryptographic data usable to secure data provided by data collector 100, (iii) generate an identifier, stamp, and/or other metadata through which data collector 100 may identify itself, (iv) identifying tests for qualifying the capabilities of data collector 100, and/or (v) a provide registration package to data collector 100 which may include any of the aforementioned information (e.g., cryptographic data, identifier, test) and/or information based on the aforementioned information.

When obtained by registration process 200, the cryptographic data and/or identifier/stamp/other metadata may be stored as registration data 204 for future use. Additionally, qualification process 202 may be initiated. During qualification process 202, any number of tests (e.g., as specified in the registration package) on hardware components 210 of data collector 100 may be performed. The test may attempt to identify the extent to which hardware components 210 meet expectations (e.g., nominal operation).

The tests may attempt to identify, for example, (i) the dynamic range, sensitivity, and/or other characteristics of sensors (e.g., microphones, light sensors, charge coupled devices, etc.); (ii) the range, fidelity, and/or other characteristics of sources (e.g., speakers, light emission devices, etc.); (iii) interference between sources and sensors; etc.

The testing may be performed by causing various actions to be performed and measurements to be taken. The testing may involve a person. For example, during performance of a test a prompt may be provided to a person operating data collector 100. User feedback may also be obtained during the testing (e.g., a user may indicate that certain portions of a prompt are completed, in process of being completed, that certain conditions are currently met, etc.). The prompts and user feedback may be used during the testing to improve the likelihood that data collector 100 is in an expected condition during the testing.

The measurements obtained during the testing may be used to obtain a measurement package. The measurement package may include any type and quantity of information based on the measurements which may be used to gauge (i) how well operation of the hardware components 210 conforms to nominal operation, (ii) the extent of deviation of the operation of the hardware components 210 from nominal operation, etc.

The measurement package may include an identifier and may be encrypted using information included in registration data 204.

Once obtained by data management system 106, the measurement package may be used to update the information regarding data collector 100 included in registration repository 252. For example, registration repository 252 may be updated to (i) associate the capabilities and limitations specified by measurement package with the identifier/cryptographic information provided in registration package, (ii) specify additional information based on the information included in measurement package, such as data management system 106 imposed limits on the use of hardware components 210 due to undesired operation of hardware components 210 (e.g., significant deviation of operation from nominal operation), etc.

Once updated, the information in registration repository 252 may be usable to (i) ascertain to which person information obtained from data collector 100 should be associated, (ii) decrypt the data from data collector 100, (iii) screen portions of the data from future use (e.g., based on performance of hardware components 210 used to obtain the portions of the data), and/or (iv) annotate the obtain data with metadata usable to characterize the quality and/or other characteristics of the data obtained from data collector 100.

Using the flow illustrated in FIG. 2A, any number of data collectors may be registered with data management system 106 thereby allowing for collection of a broad range of data from unmanaged devices.

Turning to FIG. 2B, a second data flow diagram illustrating data flows, data processing, and/or other operations that may be performed by the system of FIG. 1 in accordance with an embodiment is shown. In FIG. 2B, example flows between data collector 100 and data management system 106 are shown. It will be appreciated that similar flows with respect to additional data collectors 101 and data management system 106 may be present.

After registration of data collector 100 is complete, data management system 106 may perform data ingest process 260 through which diagnostic information from data collector 100 may be ingested. To initiate ingestion of diagnostic information, a data request may be provided to data collector 100. The data request may drive data collection process 220.

The data collection request may be based on diagnostic data request 262 and relational data 264. Diagnostic data request 262 may be a request for diagnostic data from data collector 100, and may be from a requesting entity.

However, the requested diagnostic data may be relevant for use by a range of different persons or entities. Relational data 264 may specify relationships between different type of diagnostic data and different entities that may consume it, as well as relationships between requestors and different entities which may also consume the diagnostic data. Relational data 264 may be used to identify any number of entities that may be interested in the diagnostic data. To prepare for implementation of access controls, information regarding these potentially interested entities may be provided to data collector 100 and/or other devices for review and authorization by the person for which the diagnostic data is collected. The person may agree or limit which of the potentially interested entities are to be provided with access to the to-be-collected diagnostic data. The resulting selected entities may be used to establish access controls when the diagnostic data is stored in data repository 266 and/or other locations. Refer to FIG. 2C for additional information regarding access controls for diagnostic data.

During data collection process 220, diagnostic data as specified by data request may be collected using hardware components 210. For example, various sensors, generative, and display components of data collector 100 may be operated to perform diagnostic data collection.

The display components may be used to display prompts to a user of data collector 100. The generative components may be used to generate various stimulations (e.g., optical, audio, etc.) of the user (e.g., so that diagnostic data may be collected). The sensors may be used to obtain information regarding the user and the impact of the stimulations on the user. The sensed information and/or information regarding the generative processes may be collected.

In addition to the aforementioned sensing process to obtain diagnostic information, a characterization process may also be performed. The characterization process may be similar to qualification process 202. Through the characterization process, information regarding the operation of hardware components 210 may be collected.

The diagnostic information, information regarding the operation of hardware components 210, and/or other information may be added to a measurement package. The measurement package may be signed (or otherwise attested to by data collector 100), encrypted (e.g., using a keypair or other cryptographic data), and/or identifying information (e.g., stamps) may be added to obtain a signed measurement package. The signed measurement package may be provided to data management system 106.

Data ingest process 260 may receive and analyze the signed measurement package using registration data (e.g., association between the stamp/cryptographic data/the user) from registration repository 252. Data ingest process 260 may (i) verify that the signed measurement package is from a registered device, (ii) identify the person (e.g., patient) to which the included diagnostic data is to be associated, (iii) discriminate reliable from unreliable diagnostic information (e.g., based on the qualification process, described with respect to FIG. 2A), (iv) store the reliable diagnostic information in data repository 266 (e.g., along with associations to the person, metrics regarding the quality of the diagnostic information, etc.), and/or (v) establish access controls for the stored reliable diagnostic information.

Turning to FIG. 2C, a third data flow diagram illustrating data flows, data processing, and/or other operations that may be performed by the system of FIG. 1 in accordance with an embodiment is shown.

Continuing with the discussion from FIG. 2B, once diagnostic data is obtained, the diagnostic data may be rated with respect to different types of uses (e.g., analysis processes performed in diagnosing health issues). To do so, the diagnostic data from data repository 266 may be ingested by data rating process 272. Data rating process 272 may rate the diagnostic data with respect to different uses. The rating criteria may be stored in diagnostic standards 270.

Diagnostic standards 270 may specify quality levels for diagnostic data that need to be met to be considered useful for corresponding uses. If the quality level of diagnostic data fails to meet the diagnostic standards, then the corresponding portions of the diagnostic data may not be stored in diagnostically rated data repository 274. However, portions of the diagnostic data that do meet some diagnostic standards may be stored in diagnostically rated data repository 274. Refer to FIG. 2D for additional details regarding diagnostically rated data repository 274. Additionally, while illustrated in FIG. 2C as being a separate data structure from data repository 266, it will be appreciated that diagnostically rated data repository 274 may be implemented by pruning diagnostic data from data repository 266. Thus, there may only be a single data structure in practice rather than multiple copies.

During data rating process 272, different portions of diagnostic data may be compared to corresponding standards (e.g., criteria). The standards may specify performance requirements for data collection hardware used to obtain the portions of diagnostic data. Multiple standards for different uses may be compared against the performance of the data collection hardware used to obtain the portions of diagnostic data to identify which (if any) use each portion of diagnostic data may be useful for performing.

Information regarding these uses may be stored along with the diagnostic data stored in diagnostically rated data repository 274. The information may be used to service future data requests by facilitate identification of whether diagnostic data for a particular use is available (e.g., the use may be used as a key to perform a lookup, or other processing operation).

In an embodiment, any of data collector 100 and data management system 106 are implemented using a hardware device including circuitry. The hardware device may be, for example, a digital signal processor, a field programmable gate array, or an application specific integrated circuit. The circuitry may be adapted to cause the hardware device to perform the functionality of data collector 100 and/or data management system 106 as discussed herein. Data collector 100 and/or data management system 106 may be implemented using other types of hardware devices without departing embodiment disclosed herein.

In an embodiment, any of data collector 100 and data management system 106 are implemented using a processor adapted to execute computing code stored on a persistent storage that when executed by the processor performs the functionality of data collector 100 and/or data management system 106 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, any of data collector 100 and/or data management system 106 include storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures such as data repository 266, diagnostic standards 270, diagnostically rated data repository 274, etc. discussed herein. Any of these data structures may be implemented using, for example, lists, tables databases, linked lists, unstructured data, and/or other types of data structures.

Turning to FIG. 2D, a diagram of diagnostically rated data repository 274 in accordance with an embodiment is shown. As noted above diagnostically rated data repository 274 may store diagnostic information that has been prequalified (e.g., rated) for corresponding uses.

Diagnostically rated data repository 274 may be implemented using one or more data structures that include any number of entries (e.g., 280-286). Each entry may correspond to a portion of diagnostic data (e.g., 282) that has been rated relevant for at least one use. Each entry may also specify such uses by including analysis identifiers 284. Analysis identifiers 284 may indicate the types of analysis that may be likely to be completed successfully using the corresponding portion of diagnostic data stored in entry 280.

As discussed above, because each portion of diagnostic data may be relevant for a variety of different uses, analysis identifiers 284 may include one or more identifiers of the uses.

When a request for diagnostic data for a particular use is received, analysis identifiers 284 of each entry may be used to identify whether any responsive data is available in diagnostically rated data repository 274. For example, a lookup may be performed with the contemplated use being used as a key to identify entries which include portions of diagnostic data that are likely to be usable to perform the contemplated use. Thus, in some scenarios, diagnostic data of a particular type being sought for a use may be present in diagnostically rated data repository 274, but may not be of sufficient quality for the portion of diagnostic data to be considered relevant for the use. Accordingly, in these scenarios, requests for the diagnostic data may be serviced by indicating that no responsive data is available in diagnostically rated data repository 274.

Due to the sensitive nature of the diagnostic data included in diagnostically rated data repository 274, access controls may be implemented to limit access. The access controls may be implemented on a per entry level, on a group of entry level, and/or on different levels granularity.

For example, each entry may include or be associated with corresponding access information (e.g., 286). Access information 286 may specify which entities are authorized to access the information included in the corresponding entry. As discussed with respect to FIG. 2B, for any collected diagnostic information, entities that may be interested in the diagnostic information may be enumerated and presented for ratification or modification by a person for which the diagnostic data is collected. The content of access information 286 may be based on which of the entities initially proposed by the system that are ratified by the person.

Figure 3:
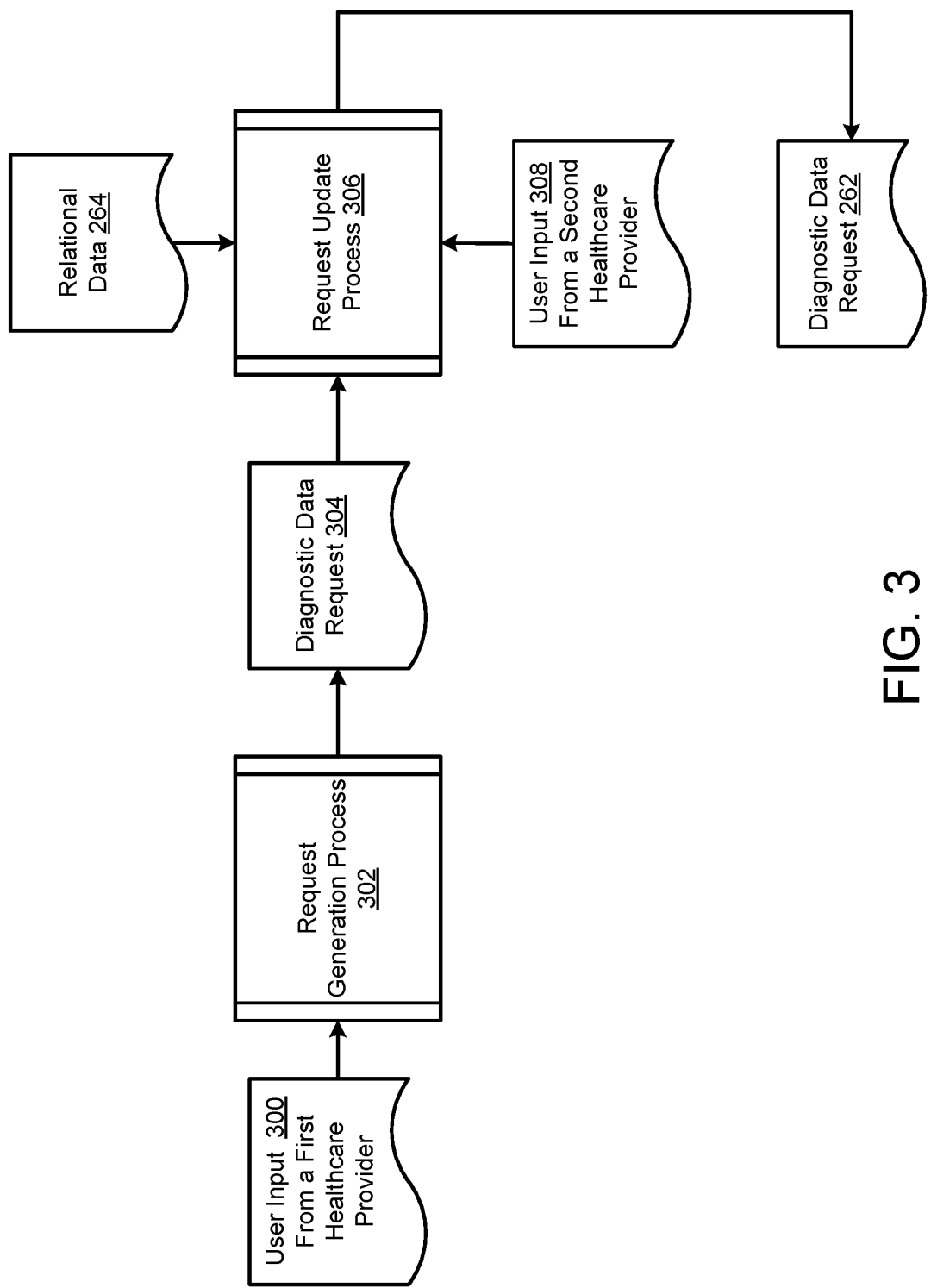
FIG. 3 shows a diagram illustrating a data flow in accordance with an embodiment.

Thus, access to the content of each entry may be granularly restricted thereby reducing the likelihood of undesired disclosure of diagnostic data included in diagnostically rated data repository 274. Refer to FIG. 3 for additional details regarding how such access information for diagnostic data may be obtained.

Turning to FIG. 2E, a fourth data flow diagram illustrating data flows, data processing, and/or other operations that may be performed by the system of FIG. 1 in accordance with an embodiment is shown.

When an access request 290 is received by data management system 106, access management process 292 may analyze the request to determine whether to provide access to diagnostic data responsive to the request.

The determination may be made using the access information of the entries of diagnostically rated data repository 274. The access information may specify which entities are to be provided with access to the corresponding diagnostic information. If the access request 290 is for an entity identified by the access request as being authorized to access the data, then diagnostic data (e.g., 294) from the entry may be provided to the requesting entity. Otherwise, access to the diagnostic data may be denied.

Turning to FIG. 3, a fifth data flow diagram illustrating data flows, data processing, and/or other operations that may be performed by the system of FIG. 1 in accordance with an embodiment is shown.

Now, consider an example scenario in accordance with an embodiment in which a first healthcare provider initiates obtaining of diagnostic data from a data collector. The first healthcare provider may do so by providing user input 300 to the data management system (directly or through another device).

Once obtained, the data management system may perform request generation process 302 through which the user input is analyzed and used to obtain diagnostic data request 304. Diagnostic data request 304 may be a request for the diagnostic data requested by the first healthcare provider.

Once generated, request update process 306 may be performed to ascertain whether any other healthcare providers may be likely to desire access to the diagnostic data in the future. During request update process 306, relational data 264 may be parsed or otherwise processed to identify the other healthcare providers (e.g., by using the requestor and the type of the diagnostic data as keys to perform a lookup).

Once identified, user input (e.g., 308) from the other healthcare providers may be obtained. The user input may indicate whether the other healthcare providers actually desire access. While described with respect to obtaining additional user input, it will be appreciated that the other healthcare providers may be presumed to desire access to the diagnostic data and no additional user input may be collected to discriminate potentially interested other healthcare providers from confirmed interested other healthcare providers.

The potentially interested and/or confirmed interested other healthcare providers may be used to update diagnostic data request 304 to obtain diagnostic data request 262. Diagnostic data request 262 may indicate that multiple healthcare providers are to be provided with access to the diagnostic data once collected.

The indicated multiple healthcare providers may then be presented for review the person for which the diagnostic data is being collected. Through the review, additional user input indicate agreement or disagreement of the person with respect to providing the multiple healthcare providers access to the diagnostic data. The diagnostic data, once obtained, may then be subjected to access controls based on the agreement/disagreement of the person. For example, only those persons who the person has indicated agreement with may be allowed to access the diagnostic data.

As discussed above, the components of FIG. 1 may perform various methods to manage operation of data processing systems. FIGS. 4A-4F illustrate methods that may be performed by the components of the system of FIG. 1. In the diagram discussed below and shown in FIGS. 4A-4F, any of the operations may be repeated, performed in different orders, and/or performed in parallel with or in a partially overlapping in time manner with other operations.

Figure 4A:
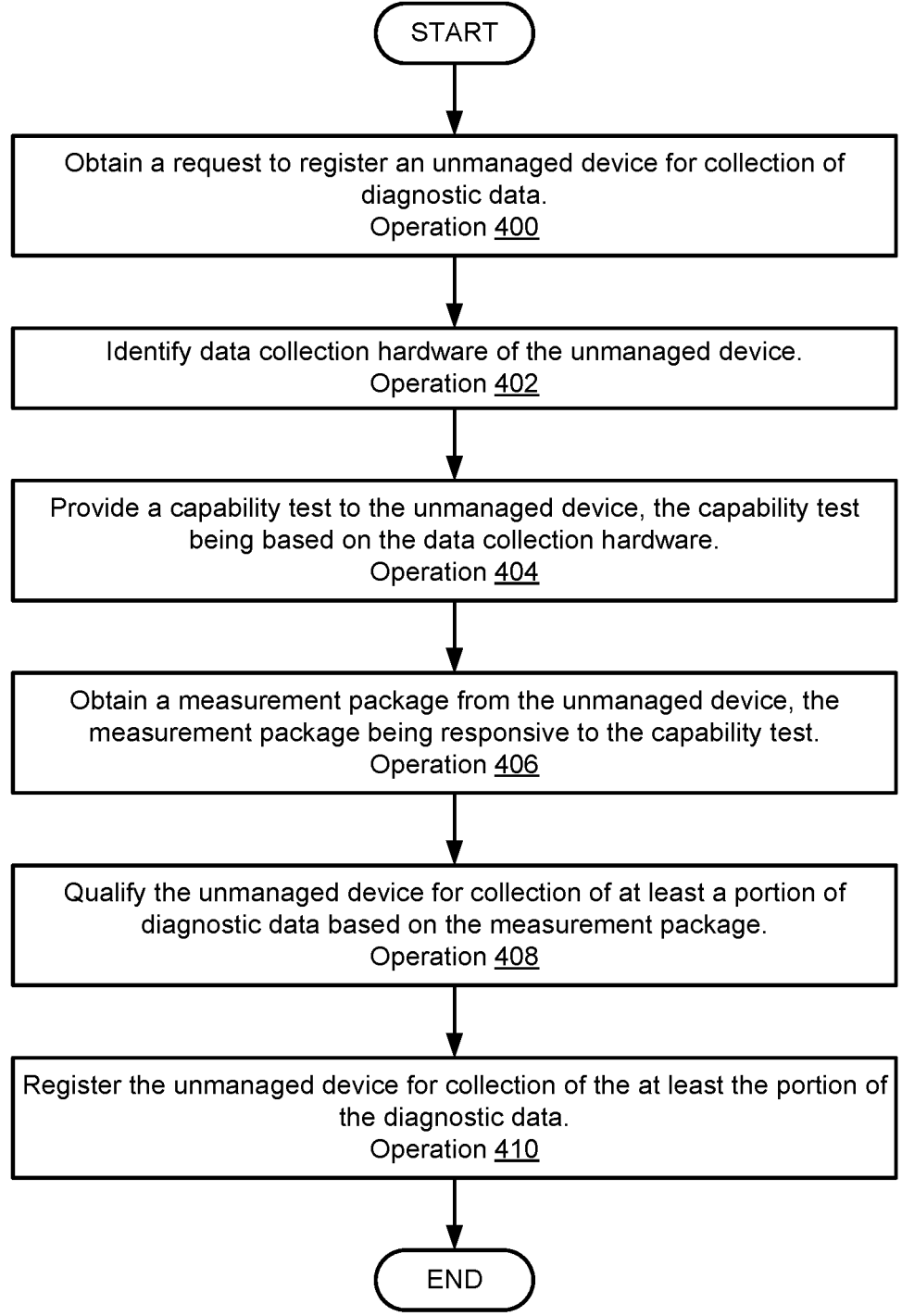
FIGS. 4A-4F show flow diagrams illustrating methods of managing data collection in accordance with an embodiment.

Turning to FIG. 4A, a flow diagram illustrating a method for managing data collection in accordance with an embodiment is shown. The method may be performed by any of data collector 100, additional data collectors 101, data management system 106, and/or other components of the system shown in FIG. 1.

Prior to operation 400, a person may interact with a healthcare provider to obtain medical services. As part of that process, the person may be instructed to provide the healthcare provider with information collectible using a data collector managed by the person rather than the healthcare provider (e.g., the data collector may not be part of a healthcare provider information technology system). For example, the healthcare provider may instruct the person to use their cell phone to collect diagnostic information which the healthcare provider may use to treat the person.

To facilitate acquisition of the diagnostic information, the person may be instructed to register their data collector with a healthcare provider information technology system (e.g., a data management system). To do so, the person may initiate the registration process by sending a request to the healthcare provider information technology system (e.g., by visiting a portal or other network accessible resource). The person may send the request using the data collector or another data processing system.

At operation 400, a request to register an unmanaged device (e.g., the data collector managed by the person) for collection of diagnostic data (e.g., which may include or otherwise represent the diagnostic information) may be obtained. The request may be obtained by receiving the request via a communication. For example, a data management system or another entity may manage a portal (e.g., a website) through which request for registration of devices may be registered. The person may provide the request via the portal.

The request may include (i) information regarding the person, (ii) information regarding the hardware components of the unmanaged device, (iii) information regarding software components of the unmanaged device, (iv) identification information (e.g., serial number, part number, product number, manufacturer, etc.) for the unmanaged device, and/or (v) other types of information usable to establish a registration for the unmanaged device.

The unmanaged device may be any type of data processing system that is not managed by the healthcare provider information technology system. For example, the unmanaged device may be a cell phone, smart watch, etc.

At operation 402, data collection hardware of the unmanaged device may be identified. The data collection hardware may be identified (i) using information included in the request, (ii) by obtaining information regarding the unmanaged device from the manufacturer or other source, (iii) by performing a lookup or other type of parsing operation using a data structure that specifies data collection hardware for different types of devices, and/or via other methods.

At operation 404, a capability test may be provided to the unmanaged device. The capability test may be based on the data collection hardware (e.g., based on the hardware components and/or the software components such as firmware, drivers, etc. of the data collection hardware).

The capability test may be provided by (i) obtaining the capability test, and (ii) providing the capability test to the unmanaged device. The capability test may be obtained by (i) reading the capability test from storage (e.g., different capability test for different types of data collection hardware may be stored in a data structure), (ii) obtaining the capability test from another device, (iii) generating the capability test (e.g., sub-tests for different data collection hardware components may be stored in a data structure, and the capability test may be generated by aggregating sub-tests corresponding to the data collection hardware components identified in operation 402), and/or via other methods.

The capability test may specify any number of actions to be performed by the unmanaged device and through which a data package may be obtained. The actions may include (i) activation of generative components (e.g., light emitting device, auditory generation devices, etc.), (ii) activation of sensing components (e.g., microphones, charge coupled devices, etc.), (iii) prompts to be displayed, (iv) user input to be collected during performance of the capability test, etc.

At operation 406, a measurement package from the unmanaged device may be obtained. The measurement package may be responsive to the capability test. In other words, the measurement package may include data specified by the capability test.

The measurement package may be obtained by receiving the measurement package from the unmanaged device, or another device.

At operation 408, the unmanaged device may be qualified for collection of at least a portion of the diagnostic data based on the measurement package. The unmanaged device may by qualified by (i) identifying levels of divergence of the data collection hardware from nominal operation, (ii) comparing the levels of divergence to thresholds or other criteria, and (iii) establishing procedures for processing different types of diagnostic data obtained using the data collection hardware based on the comparisons.

For example, consider a scenario in which an unmanaged device includes a microphone as part of data collection hardware. The measurement package may specify a dynamic range for the microphone. The dynamic range may be compared to an expected dynamic range for the microphone during nominal operation of the microphone. A delta between the dynamic range and the expected dynamic range may be identified. The delta may be analyzed using criteria (e.g., thresholds). The criteria may specify progressively larger deltas. Each of the criteria may be associated with different procedures for processing diagnostic data obtained using the microphone.

The procedures may include (i) adding metadata to the diagnostic data that specifies the extent of deviation of the dynamic range from the expected dynamic range, (ii) portions of the diagnostic data that are to be discarded (e.g., diagnostic data that is too close to the dynamic range limits for the microphone, indicating that such diagnostic data is not reliable), (iii) discarding all diagnostic data collected using the microphone (e.g., in cases in which the dynamic range deviates to such a large degree that any collected data is likely to be unreliable), and/or other types of procedures. In this scenario, procedures (i)-(iii) may each be associated with criteria that requires progressively larger deviations between the dynamic range and expected dynamic range for the microphone. Thus, depending on the actual performance of the microphone, the procedures for processing diagnostic data collected using the microphone may vary.

The procedures may be established by recording the procedures in a data structure and associating the procedures with the corresponding data collection hardware components. Any number of processing procedures may be established for any quantity of data collection hardware.

At operation 410, the unmanaged device is registered for collection of the at least the portion of the diagnostic data. The unmanaged device may be registered by (i) providing the unmanaged device with an identifier to identify itself to a data management system, (ii) providing the unmanaged device with cryptographic data usable to secure transmission of diagnostic data, and/or other information usable to identify itself the data management system, secure diagnostic data, and/or otherwise facilitate collection of diagnostic data. Additionally, the unmanaged device may be register by storing similar information in a record managed by the data management system. The record may also include (i) identifying information for the unmanaged device, (ii) associations to corresponding procedures for processing diagnostic data from the unmanaged system, (iii) associations to persons for which the diagnostic data is collection, and/or other types of information usable to manage diagnostic data collection.

The method may end following operation 410.

After registration, diagnostic data may be collected from the unmanaged device.

Figure 4B:
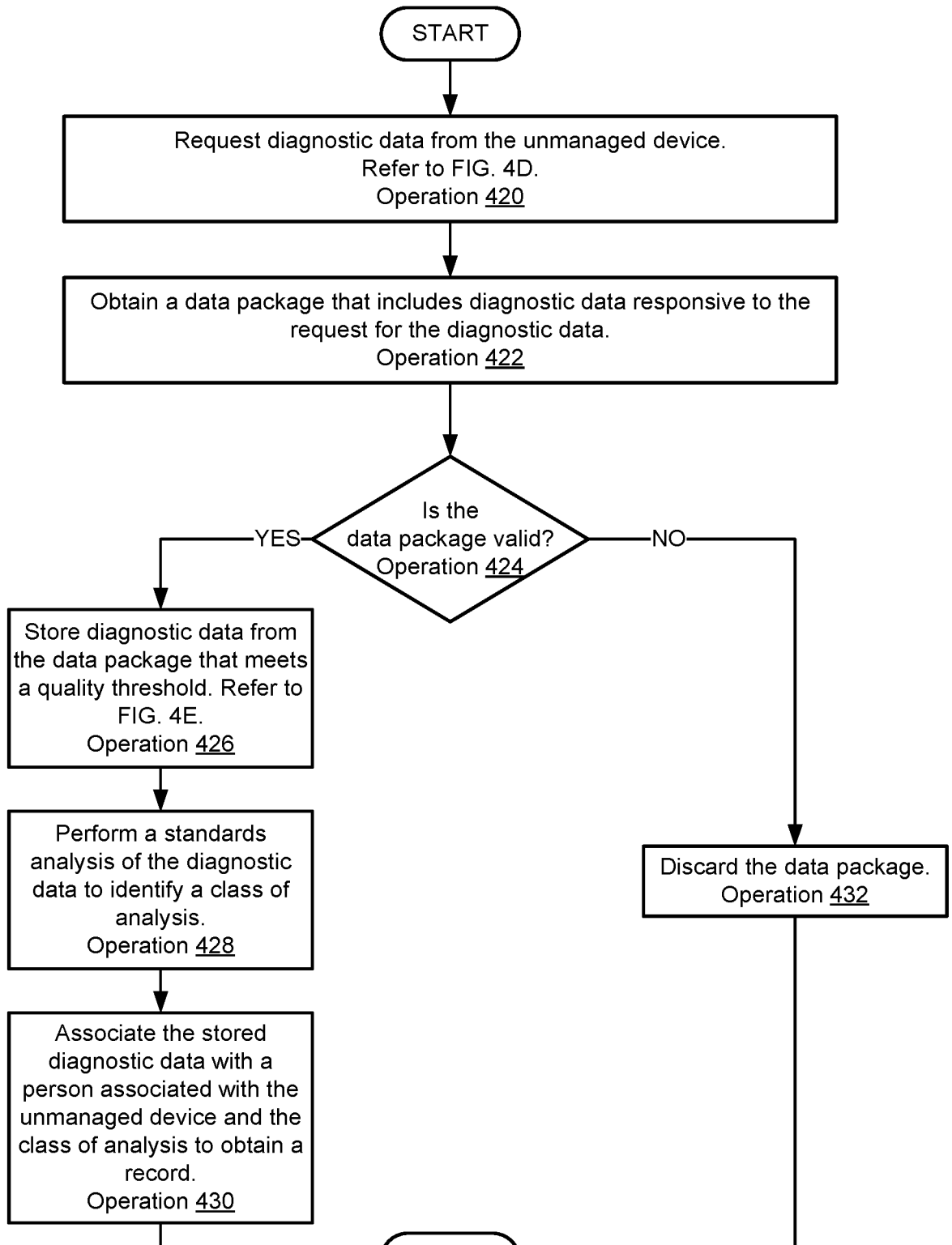

Turning to FIG. 4B, a flow diagram illustrating a method of collecting diagnostic data from unmanaged devices in accordance with an embodiment is shown. The method may be performed by any of data collector 100, additional data collectors 101, data management system 106, and/or other components of the system shown in FIG. 1.

Prior to operation 420, a data management system or another device may determine that diagnostic data for the patient may be desired for treatment purposes. A request for diagnostic data may be generated to obtain the diagnostic data. For example, a healthcare provider may initiate collection of the diagnostic data by providing user input indicating the request.

At operation 420, a request for diagnostic data from an unmanaged device is obtained. The request for the diagnostic data may be obtained by (i) receiving the request from another device, (ii) generating the request (e.g., an application or other piece of software hosted by the unmanaged device may generate the request, or a data management system may generate the request), and/or via other methods. If the request is generated by a data management system, the request may be sent to the unmanaged device through which the diagnostic data will be obtained.

The request may also indicate the entities for which access to the collected diagnostic data is to be provided. The diagnostic data may be requested via the method illustrated in FIG. 4D.

At operation 422, a data package that includes diagnostic data is obtained. The diagnostic data may be responsive to the request, or may be independent from the request. For example, a user of the unmanaged device may independently initiate collection of diagnostic data.

The data package may be obtained by receiving it from the unmanaged device, or another device.

At operation 424, a determination is made regarding whether the data package is valid. The determination may be made by (i) comparing identifying information (e.g., stamps) to corresponding information stored in records managed by a data management system for registered devices, and (ii) attempting to decrypt the data using cryptographic data established during registration of the unmanaged device. If the comparison indicates that the unmanaged device is not registered (e.g., no corresponding record) or that the data package cannot be decrypted, then it may be determined that the data package is not valid. If the comparison indicates that the unmanaged device is registered (e.g., no corresponding record) and that the data package can be decrypted, then it may be determined that the data package is valid.

If the data package is valid, then the method may proceed to operation 426. Otherwise the method may proceed to operation 432.

At operation 426, the diagnostic data from the data package that meets quality thresholds may be stored. The diagnostic data from the data package that meets quality thresholds may be stored by (i) identifying procedures for processing portions of the diagnostic data based on the data collection components used to obtain the respective portions, and (ii) implementing the procedures corresponding to the respective portions of the diagnostic data. In this manner, various portions may be (i) stored without modification, (ii) other portions may be stored with added metadata, (iii) various portions may be discarded without storing them, and (iv) all portions may be discarded if so specified by the procedures.

In the event that the data package also includes calibration data indicating the current capabilities of the data collection hardware of the unmanaged device when the diagnostic data was obtained, the calibration data may be used to at least temporarily update the procedures used to process the diagnostic data. For example, a similar qualification process as described with respect to operation 308 may be performed using the calibration data. The resulting procedures may be used to process the diagnostic data in the data package and/or may be used to update the procedures maintained by the data management system for the unmanage device.

Additionally, access controls may be applied to the stored diagnostic data. The access controls may be implemented using the method illustrated in FIG. 4E, or other methods.

At operation 428, a standards analysis of the diagnostic data is performed to identify a class of analysis. The class of analysis may be used for which the diagnostic data is relevant. Any number of classes of analysis may be identified.

The class of analysis may be identified by (i) identifying performance of data collection hardware (e.g., may be similar to operation 308) used to obtain portions of the diagnostic data, (ii) comparing the performance of the data collection hardware to various performance standards associated with different classes of analysis, and (iii) identifying any of the classes of analysis for which the performance of the data collection hardware met the performance standards.

At operation 430, the stored diagnostic data is associated with a person associated with the unmanaged device and the class of analysis to obtain a record. The stored diagnostic data may include different portions, each of which may be associated with the person and the corresponding classes of analysis for which the respective portions were qualified in operation 328. The stored diagnostic data may be associated by (i) adding metadata reflecting the associations, (ii) updating table or other data structures that define how stored data is associated with persons, and/or via other methods. The resulting data structure may be a record or entry, as described with respect to FIG. 2D.

The method may end following operation 430.

Returning to operation 424, the method may proceed to operation 432 if the data package is not valid.

At operation 432, the data package is discarded. The data package may be discarded by deleting the data package without storing information regarding the data package for future use.

Metadata indicating that the data package had been obtained and discarded may be stored for future use.

The method may end following operation 432.

Using the methods illustrated in FIGS. 3A-3B, embodiments disclosed here in may facilitate collection of diagnostic data from unmanaged devices while improving the likelihood that the collected diagnostic data is usable for diagnostic purposes. For example, the disclosed methods may reduce the likelihood of malicious entities interjecting falsified diagnostic data and improve the likelihood that limits on the quality of the collected diagnostic data are understood by users (e.g., healthcare providers) of the diagnostic data.

In contrast to managed devices which may undergo regular maintenance and performance testing, may generally be secured physically, and may otherwise be less likely to provide low quality or malicious information, unmanaged device may not be similarly managed. However, by virtue of these management procedures for managed devices, the managed devices may be less able to provide large amounts of diagnostic data over time for different persons (e.g., to logistic and cost requirements). These limits may reduce the likelihood of successfully diagnosing patient conditions by virtue of limited quantities of diagnostic data availability for persons. By facilitating supplementation of diagnostic data collection through unmanaged devices, embodiments disclosed herein may improve the likelihood of successful diagnosis and treatment through increased collection of diagnostic data.

Figure 4C:
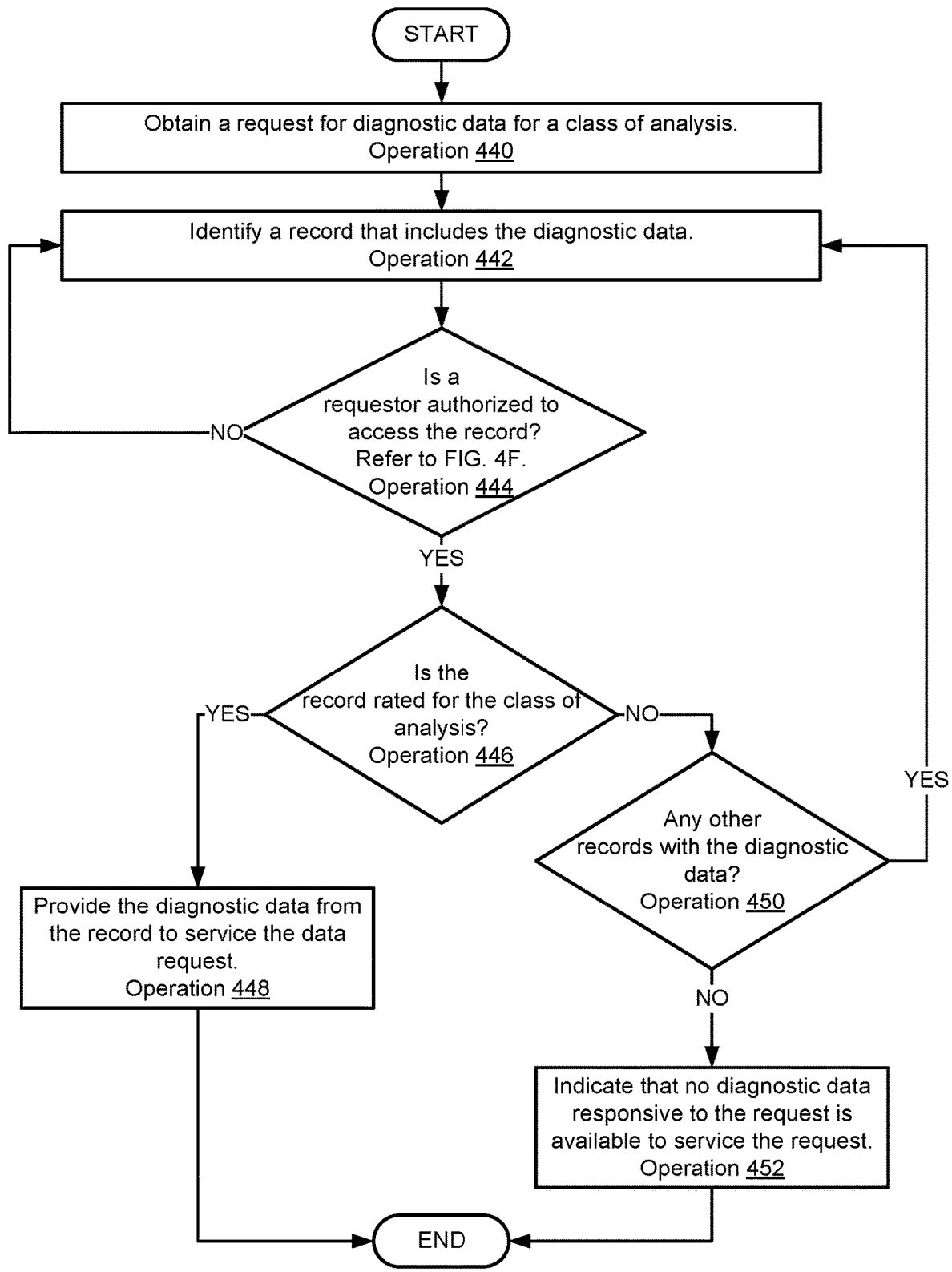

Turning to FIG. 4C, a flow diagram illustrating a method of providing data usable for diagnostic purposes in accordance with an embodiment is shown. The method may be performed by any of data collector 100, additional data collectors 101, data management system 106, and/or other components of the system shown in FIG. 1.

At operation 440, a request for diagnostic data is obtain for a class of analysis. The request may be obtained by (i) receiving it from another device, (ii) obtaining user input indicating the request, and/or via other methods.

At operation 442, a record that includes the diagnostic data is identified. The record may be identified by (i) identifying a type of the diagnostic data, and (ii) discriminating entries (e.g., 280) that include the type of the diagnostic data from other entries (e.g., 286). The discrimination may be performed using a lookup or other processing operation. The records may be an of the discriminated records.

At operation 444, a determination is made regarding whether a requestor (e.g., that initiated the request for the diagnostic data) is authorized to access the record. The determination may be made via the method illustrated in FIG. 4F, or other methods.

If the requestor is authorized to access the record, then the method may proceed to operation 446. Otherwise, the method may proceed to operation 442. If the method proceeds to operation 442, then a different record that include the diagnostic data but that has not yet been analyzed may be identified. If no records that have not yet been analyzed with respect to operation 444 remain, then the method may end following operation 444 rather than proceeding to operation 442.

At operation 446, a determination is made regarding whether the record is rated for the class of analysis. The determination may be made by comparing the class of analysis to analysis identifiers included in the matched records. If any of the analysis identifiers match the class of analysis, then it may be determined that the record is rated for the class of analysis.

If the records is rated for the class of analysis, then the method may proceed to operation 448. Otherwise the method may proceed to operation 450.

At operation 448, the diagnostic data may be provided from the record to service the data request. The diagnostic data may be provided by sending the diagnostic data to a request entity.

The method may end following operation 448.

Returning to operation 446, the method may proceed to operation 450 following operation 446 if the record is not rated for the class of analysis.

At operation 450, a determination is made regarding whether any other records include the diagnostic data. The determination may be made by ascertain whether any of the records discriminated in operation 442 have not yet been analyzed as set forth in operation 446. If any of the discriminated records have not yet been analyzed, then it may be determined that other records also include the diagnostic data.

If any of the other records include the diagnostic data, then the method may proceed to operation 442. Otherwise, the method may proceed to operation 452.

The method may proceed to operation 442, for example, in a scenario in which a first discriminated record includes the diagnostic data but at a degree of fidelity such that it is not rated for the class of analysis but a second discriminated record also includes similar diagnostic data (at a similar or different degree of fidelity, but that has not yet been analyzed under the criteria set out in operation 346).

If the method returns to operation 442 following operation 450, then one of these not yet analyzed but discriminated records may be identified as the record, and may be subjected to analysis as set out in operation 446.

At operation 452, it is indicated (e.g., to a requestor) that no responsive diagnostic data is available to service the request. The lack of responsive diagnostic data may be indicated by sending a message to the requestor indicating that no relevant diagnostic data is available.

The method may end following operation 452.

Using the method illustrated in FIG. 3C, embodiments disclosed here may facilitate distribution of diagnostic data that is relevant for certain uses, while screening diagnostic data that is irrelevant for other uses. By doing so, users of the data may be less likely to misinterpret or misuse the data thereby improving the likely outcomes of treatment plans.

Figure 4D:
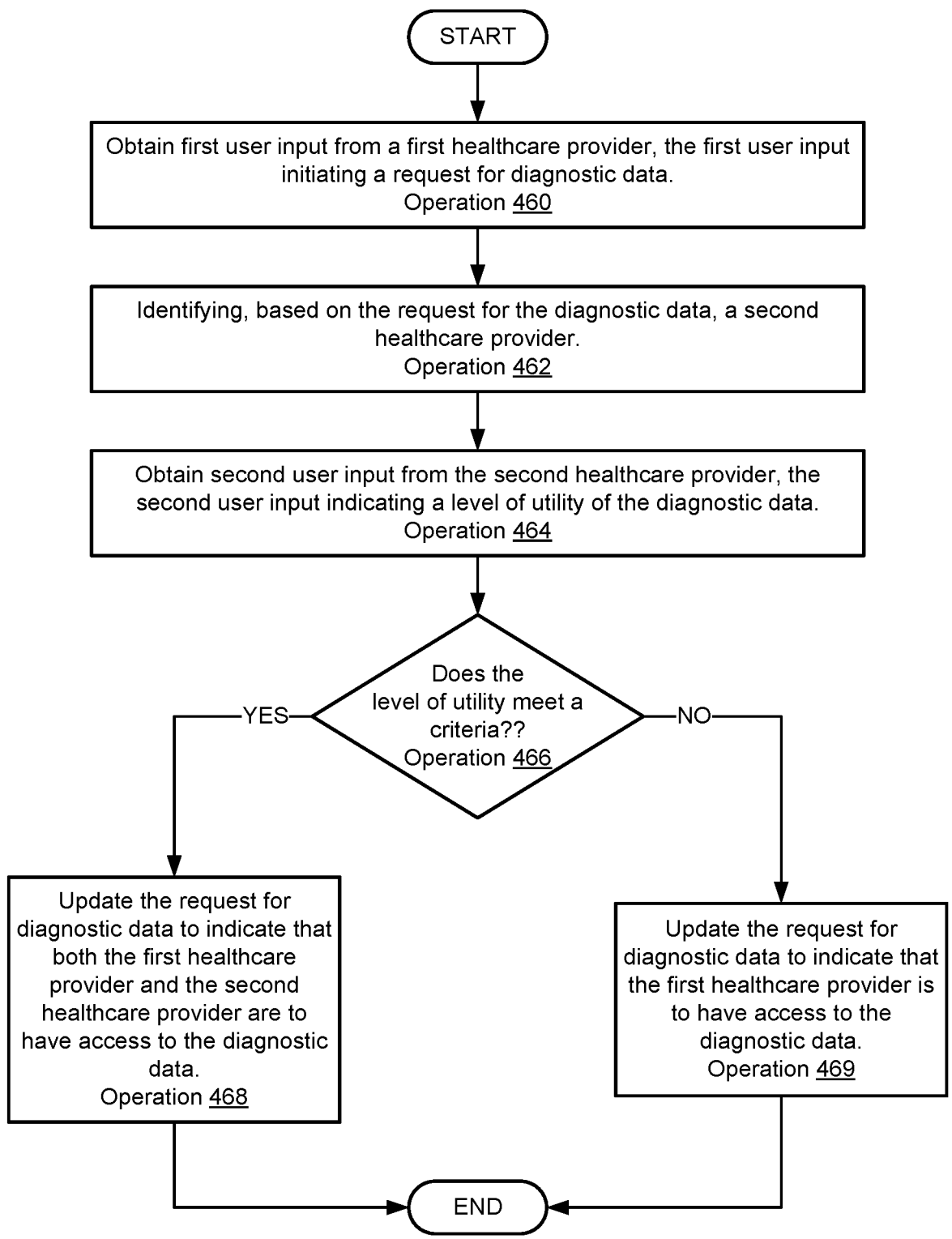

Turning to FIG. 4D, a flow diagram illustrating a method of establishing a request for diagnostic data in accordance with an embodiment is shown. The method may be performed by any of data collector 100, additional data collectors 101, data management system 106, and/or other components of the system shown in FIG. 1.

At operation 460, first user input from a first healthcare provider is obtained. The first user input may initiate a request for diagnostic data. For example, the user input may indicate that diagnostic data collectible via an unmanaged device is to be obtained. The first user input may be obtained by receiving it from a data processing device (e.g., via a keyboard, mouse, or other input device).

At operation 462, a second healthcare provider is identified based on the request for the diagnostic data. The second healthcare provider may be identified by performing matching based on (i) an identity, role, type of healthcare provider, and/or other characteristic of the first healthcare provider, (ii) the type of the diagnostic data, and/or other criteria. The matching may be performed using a data structure that associates these criteria with various healthcare providers. For example, the data structure may associate similar types of healthcare providers that would likely be interested in similar diagnostic data for diagnostic purposes. In another example, the data structure may associate types of diagnostic data with healthcare providers that use the type of diagnostic data for diagnostic purposes.

The second healthcare provider may be one of any number of other healthcare providers identified via the matching.

At operation 464, second user input for the second healthcare provider is obtained. The second user input may indicate a level of utility of the diagnostic data for use by the second healthcare provider. The second user input may be obtained similarly to the first user input.

At operation 466, a determination is made regarding whether the level of utility meets a criteria. The criteria may be, for example, a threshold or other metric for discriminating diagnostic data likely to be used by the second healthcare provider based on the level of utility from other diagnostic data that is unlikely to be used by the second healthcare provider. The criteria may be stored in a data structure that includes different criteria for different healthcare providers. The determination may be made by comparing the level of utility to the criteria.

If the level of utility meets the criteria, then the method may proceed to operation 468. Otherwise the method may proceed to operation 469.

At operation 468, the request for diagnostic data is updated to indicate that both the first healthcare provider and the second healthcare provider are to have access to the diagnostic data. The request may be updated by adding, for example, identifiers of the healthcare providers, cryptographic data usable to verify that the healthcare providers indicated their interest in the diagnostic data, and/or other information usable to establish access controls for the diagnostic data.

The method may end following operation 468.

Returning to operation 466, the method may proceed to operation 469 following operation 466 when the level of utility does not meet the criteria.

At operation 469, the request for the diagnostic data is updated to indicate that the first healthcare provider is to have access to the diagnostic data. The request may be updated similarly to as described with respect to operation 468. However, the resulting updated request may only indicate that the first healthcare provider is to be provided access to the diagnostic data.

The method may end following operation 469.

While described with respect to a second healthcare provider, it will be appreciated that operations 462-469 may be performed any number of times for any number of times to ascertain whether any number of healthcare providers are to be provided with access to the diagnostic data.

Once the updated request is available, the information reflecting the healthcare providers may be used to update access information for the diagnostic data once obtained.

Figure 4E:
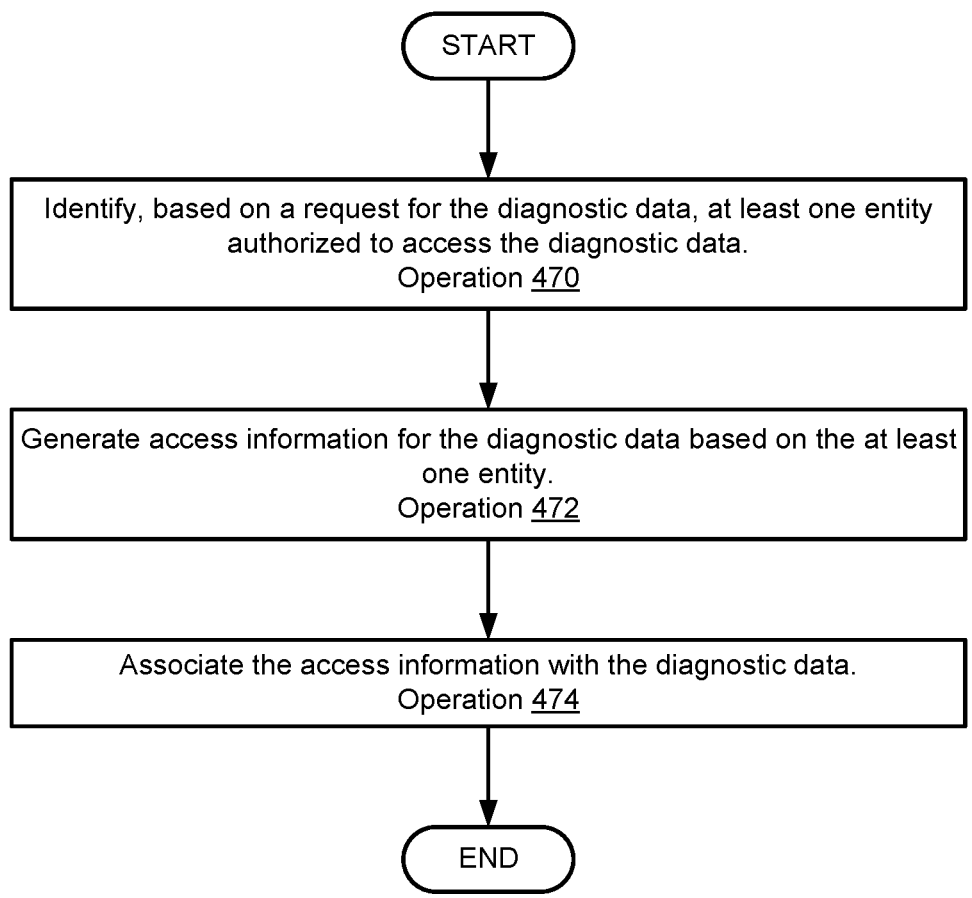

Turning to FIG. 4E, a flow diagram illustrating a method of establishing access information for diagnostic data in accordance with an embodiment is shown. The method may be performed by any of data collector 100, additional data collectors 101, data management system 106, and/or other components of the system shown in FIG. 1.

At operation 470, at least one entity authorized to access diagnostic data is identified based on a request for the diagnostic data. The request may have initiated acquisition of the diagnostic data. The at least one entity may be identified based on information included in the request for the diagnostic data. The request may be parsed to obtain information regarding the at least one entity authorized to access the diagnostic data.

At operation 472, access information for the diagnostic data is generated based on the at least one entity. The access information may be generated by adding information regarding the at least one entity authorized to access the diagnostic data to a data structure.

At operation 474, the access information is associated with the diagnostic data. The access information may be associated by storing the access information in a record (e.g., entry) in which the diagnostic information (or a portion thereof) is stored, or another data structure associated with the diagnostic data.

The method may end following operation 474.

Once the access information is associated with the diagnostic data, the access information may be used to implement access controls for the diagnostic data.

Figure 4F:
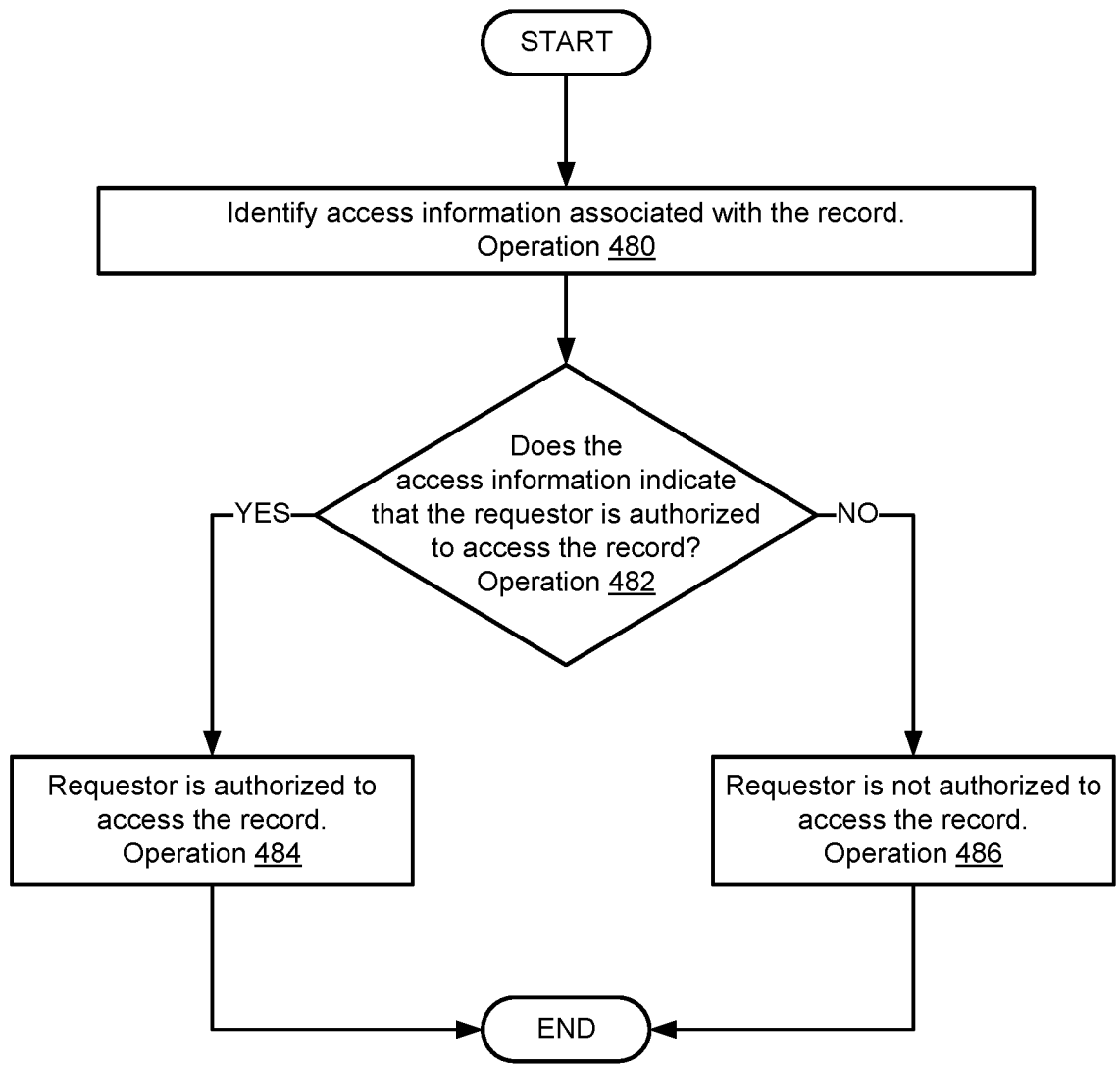

Turning to FIG. 4F, a flow diagram illustrating a method of identifying whether a requestor of diagnostic data is authorized to access the diagnostic data in accordance with an embodiment is shown. The method may be performed by any of data collector 100, additional data collectors 101, data management system 106, and/or other components of the system shown in FIG. 1.

At operation 480, access information associated with a record to be accessed is identified. The access information may be identified by reading it from the record, or another data structure associated with diagnostic data of the record.

At operation 482, a determinations is made regarding whether the access information indicates that the requestor is authorized to access the record. The determination may be made by comparing the identity of the requestor to identities of entities specified in the access information. If the identity matches any of the specified entities, then it may be determined that the access information indicates that the requestor is authorized to access the record.

If the requestor is authorized to access the record, then the method may proceed to operation 484. Otherwise the method may proceed to operation 486.

At operation 484, it is determined that the requestor is authorized to access the record.

The method may end following operation 484.

Returning to operation 482, the method may proceed to operation 486 if the access information indicates that the requestor is not authorized to access the record.

At operation 486, it is determined that the requestor is not authorized to access the record.

The method may end following operation 486.

Using the methods illustrated in FIGS. 4A-4F, embodiments disclosed here may facilitate acquisition and control of diagnostic data obtain from a variety of data collectors. The access controls used to manage the diagnostic data may reduce the likelihood of undesired disclosures of the diagnostic data from occurring.

Figure 5:
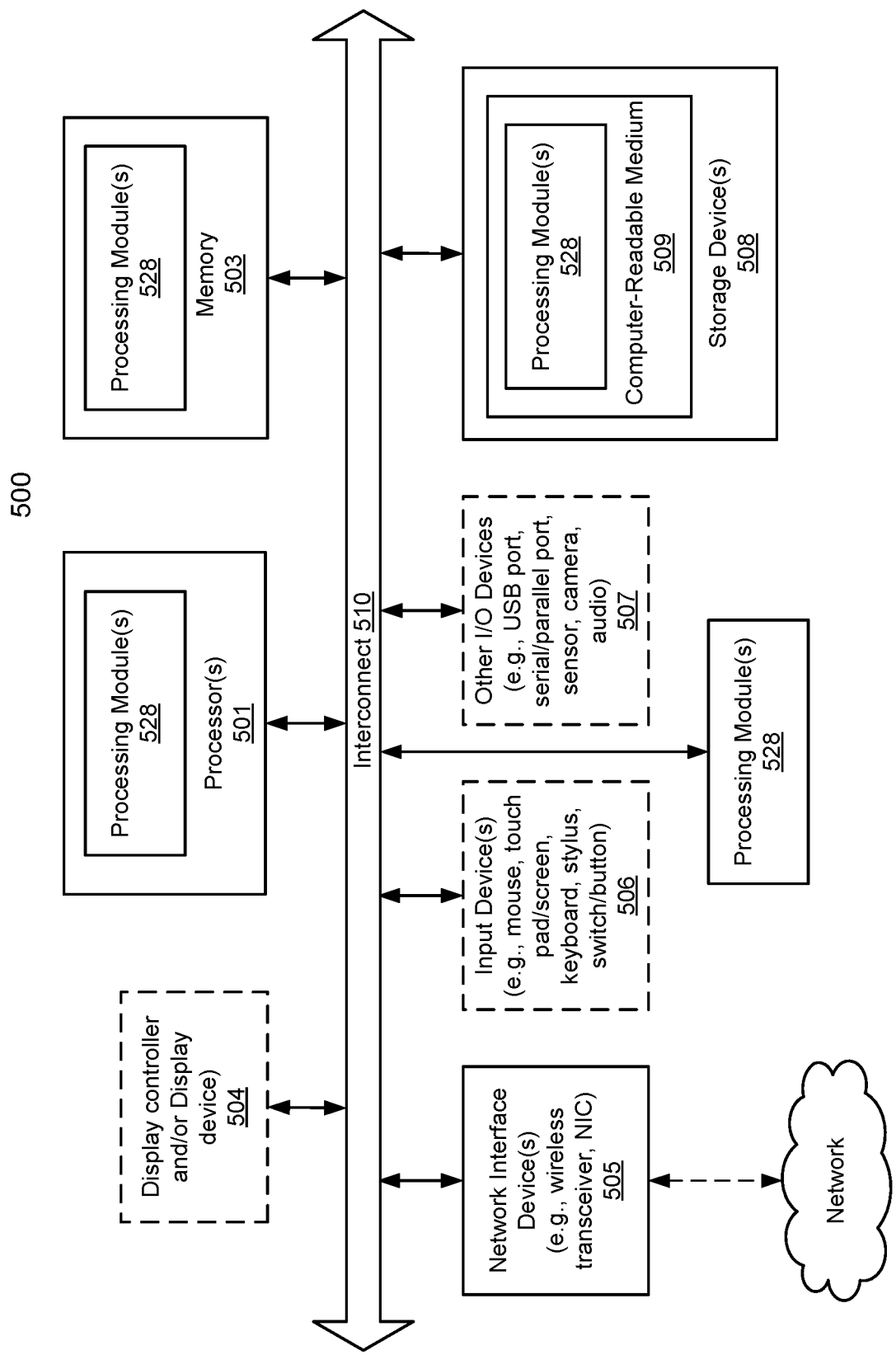
FIG. 5 shows a block diagram illustrating a data processing system in accordance with an embodiment.

Any of the components illustrated in FIGS. 1-3 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data collection for managed devices and unmanaged devices, the method comprising:
  obtaining a request for a type of diagnostic data that:
    was obtained from an unmanaged device of the unmanaged devices, and
    is stored in a data management system;
  identifying, based on the request, a record in which diagnostic data of the type of diagnostic data is stored;
  obtaining, from the records, access information specifying:
    a first entity that initiated obtaining of the diagnostic data, and
    a second entity that did not initiate obtaining of the diagnostic data and that attested to utility of the diagnostic data;

making a determination regarding whether an entity that initiated the request is the first entity or the second entity;
in a first instance of the determination where the entity is the first entity or the second entity:
providing the entity that initiated the request access to the diagnostic data to service the request; and
in a second instance of the determination where the entity is not the first entity or the second entity:
denying the entity that initiated the request access to the diagnostic data.

2. The method of claim 1, further comprising:
prior to obtaining the request:
obtaining, from the first entity, a request for the diagnostic data;
identifying the second entity based on the diagnostic data;
obtaining, from the second entity, and indication of the utility of the diagnostic data; and
updating the request for the diagnostic data to indicate that the first entity and the second entity are to be provided access to the diagnostic data.

3. The method of claim 2, wherein identifying the second entity comprises:
identifying, based on the type of the diagnostic data, at least one first candidate entity;
identifying, based on a type of the first entity, at least one second candidate entity; and
identifying the second entity based on the at least one first candidate entity and the at least one second candidate entity.

4. The method of claim 3, wherein identifying the second entity based on the at least one first candidate entity and the at least one second candidate entity comprises:
identifying that the second entity is a member of the at least one first candidate entity and the at least one second candidate entity to determine that the second entity is likely to use the diagnostic data.

5. The method of claim 4, wherein the at least one first candidate entity comprises members that each are associated with the type of the diagnostic data, and the at least one second candidate entity comprises members that each are associated with the type of the first entity.

6. The method of claim 5, wherein the members of the at least one second candidate entity have a same role.

7. The method of claim 6, wherein the members of the at least one first candidate entity have a role that is likely to utilize the diagnostic data in performance of the role.

8. A non-transitory machine-readable medium having instructions stored therein, which when executed by a processor, cause the processor to perform operations for managing data collection for managed devices and unmanaged devices, the operations comprising:
obtaining a request for a type of diagnostic data that:
was obtained from an unmanaged device of the unmanaged devices, and
is stored in a data management system;
identifying, based on the request, a record in which diagnostic data of the type of diagnostic data is stored;
obtaining, from the records, access information specifying:
a first entity that initiated obtaining of the diagnostic data, and
a second entity that did not initiate obtaining of the diagnostic data and that attested to utility of the diagnostic data;
making a determination regarding whether an entity that initiated the request is the first entity or the second entity;
in a first instance of the determination where the entity is the first entity or the second entity:
providing the entity that initiated the request access to the diagnostic data to service the request; and
in a second instance of the determination where the entity is not the first entity or the second entity:
denying the entity that initiated the request access to the diagnostic data.

9. The non-transitory machine-readable medium of claim 8, wherein the operations further comprise:
prior to obtaining the request:
obtaining, from the first entity, a request for the diagnostic data;
identifying the second entity based on the diagnostic data;
obtaining, from the second entity, and indication of the utility of the diagnostic data; and
updating the request for the diagnostic data to indicate that the first entity and the second entity are to be provided access to the diagnostic data.

10. The non-transitory machine-readable medium of claim 9, wherein identifying the second entity comprises:
identifying, based on the type of the diagnostic data, at least one first candidate entity;
identifying, based on a type of the first entity, at least one second candidate entity; and
identifying the second entity based on the at least one first candidate entity and the at least one second candidate entity.

11. The non-transitory machine-readable medium of claim 10, wherein identifying the second entity based on the at least one first candidate entity and the at least one second candidate entity comprises:
identifying that the second entity is a member of the at least one first candidate entity and the at least one second candidate entity to determine that the second entity is likely to use the diagnostic data.

12. The non-transitory machine-readable medium of claim 11, wherein the at least one first candidate entity comprises members that each are associated with the type of the diagnostic data, and the at least one second candidate entity comprises members that each are associated with the type of the first entity.

13. The non-transitory machine-readable medium of claim 12, wherein the members of the at least one second candidate entity have a same role.

14. The non-transitory machine-readable medium of claim 13, wherein the members of the at least one first candidate entity have a role that is likely to utilize the diagnostic data in performance of the role.

15. A data processing system, comprising:
a processor; and
a memory coupled to the processor to store instructions, which when executed by the processor, cause the processor to perform operations for managing data collection for managed devices and unmanaged devices, the operations comprising:
obtaining a request for a type of diagnostic data that:
was obtained from an unmanaged device of the unmanaged devices, and
is stored in a data management system;
identifying, based on the request, a record in which diagnostic data of the type of diagnostic data is stored;

obtaining, from the records, access information specifying:
a first entity that initiated obtaining of the diagnostic data, and
a second entity that did not initiate obtaining of the diagnostic data and that attested to utility of the diagnostic data;
making a determination regarding whether an entity that initiated the request is the first entity or the second entity;
in a first instance of the determination where the entity is the first entity or the second entity:
providing the entity that initiated the request access to the diagnostic data to service the request; and
in a second instance of the determination where the entity is not the first entity or the second entity:
denying the entity that initiated the request access to the diagnostic data.

16. The data processing system of claim 15, wherein the operations further comprise:
prior to obtaining the request:
obtaining, from the first entity, a request for the diagnostic data;
identifying the second entity based on the diagnostic data;
obtaining, from the second entity, and indication of the utility of the diagnostic data; and
updating the request for the diagnostic data to indicate that the first entity and the second entity are to be provided access to the diagnostic data.

17. The data processing system of claim 16, wherein identifying the second entity comprises:
identifying, based on the type of the diagnostic data, at least one first candidate entity;
identifying, based on a type of the first entity, at least one second candidate entity; and
identifying the second entity based on the at least one first candidate entity and the at least one second candidate entity.

18. The data processing system of claim 17, wherein identifying the second entity based on the at least one first candidate entity and the at least one second candidate entity comprises:
identifying that the second entity is a member of the at least one first candidate entity and the at least one second candidate entity to determine that the second entity is likely to use the diagnostic data.

19. The data processing system of claim 18, wherein the at least one first candidate entity comprises members that each are associated with the type of the diagnostic data, and the at least one second candidate entity comprises members that each are associated with the type of the first entity.

20. The data processing system of claim 19, wherein the members of the at least one second candidate entity have a same role.

* * * * *